(12) United States Patent
Nishio et al.

(10) Patent No.: US 11,332,030 B2
(45) Date of Patent: May 17, 2022

(54) POWER SYSTEM INTERCONNECTION SYSTEM, AND METHOD OF INSTALLING POWER SYSTEM INTERCONNECTION SYSTEM

(71) Applicant: DAIHEN Corporation, Osaka (JP)

(72) Inventors: Ryuhei Nishio, Osaka (JP); Akihiro Ohori, Osaka (JP); Nobuyuki Hattori, Osaka (JP); Koji Matsunaga, Osaka (JP)

(73) Assignee: DAIHEN Corporation, Osaka (JP)

( * ) Notice: Subject to any disclaimer, the term of this patent is extended or adjusted under 35 U.S.C. 154(b) by 0 days.

(21) Appl. No.: 17/056,156

(22) PCT Filed: Jun. 27, 2019

(86) PCT No.: PCT/JP2019/025522
§ 371 (c)(1),
(2) Date: Nov. 17, 2020

(87) PCT Pub. No.: WO2020/008985
PCT Pub. Date: Jan. 9, 2020

(65) Prior Publication Data
US 2021/0213843 A1    Jul. 15, 2021

(30) Foreign Application Priority Data

Jul. 3, 2018   (JP) .............................. JP2018-127054
Jul. 3, 2018   (JP) .............................. JP2018-127055
Jul. 9, 2018   (JP) .............................. JP2018-130249

(51) Int. Cl.
*B60L 53/60*        (2019.01)
*B60L 58/18*        (2019.01)
(Continued)

(52) U.S. Cl.
CPC .............. *B60L 53/60* (2019.02); *B60L 58/18* (2019.02); *H02H 7/22* (2013.01); *H02J 9/06* (2013.01); *B60L 2210/30* (2013.01)

(58) Field of Classification Search
CPC ...... B60L 53/60; B60L 58/18; B60L 2210/30; H02H 7/22; H02J 9/06
(Continued)

(56) References Cited

U.S. PATENT DOCUMENTS

2004/0066094 A1   4/2004   Suzuki et al.
2009/0085404 A1   4/2009   Suzuki et al.
(Continued)

FOREIGN PATENT DOCUMENTS

JP   2006-158084 A   6/2006
JP   2006-254694 A   9/2006
(Continued)

OTHER PUBLICATIONS

English Translation of International Search Report for PCT Application No. PCT/JP2019/025522 dated Aug. 27, 2019, 2 pages.

*Primary Examiner* — Michael R. Fin
(74) *Attorney, Agent, or Firm* — Rudy J. Ng; Bret E. Field; Bozicevic, Field & Francis LLP

(57) ABSTRACT

An object is to provide a power system interconnection system and a method of installing the power system interconnection system that are able to supply a load with required power. A power system interconnection system comprises a storage battery an AC-DC power conversion device for the storage battery a charge and discharge station for an electric-powered automobile and an interconnection control device that are installed on a parking lot. The interconnection control device supplies a first load with power from at least one of the charge and discharge station and the AC-DC power conversion device in a case where the electric power system is in an emergency situation.

18 Claims, 21 Drawing Sheets

(51) Int. Cl.
*H02H 7/22* (2006.01)
*H02J 9/06* (2006.01)

(58) Field of Classification Search
USPC .......................................................... 307/31
See application file for complete search history.

(56) References Cited

U.S. PATENT DOCUMENTS

| | | | | |
|---|---|---|---|---|
| 2011/0226516 | A1* | 9/2011 | Takeda | H05K 1/0231 |
| | | | | 174/260 |
| 2012/0259723 | A1* | 10/2012 | Ansari | H02J 3/383 |
| | | | | 705/26.3 |
| 2016/0176305 | A1* | 6/2016 | James | B60L 53/53 |
| | | | | 307/26 |
| 2017/0008413 | A1* | 1/2017 | Reineccius | H02J 3/381 |
| 2019/0077270 | A1* | 3/2019 | Nieto | B60L 53/14 |
| 2019/0168630 | A1* | 6/2019 | Mrlik | H02J 3/381 |

FOREIGN PATENT DOCUMENTS

| | | |
|---|---|---|
| JP | 2011-188607 A | 9/2011 |
| JP | 2012-050291 A | 3/2012 |
| JP | 2012-135153 A | 7/2012 |
| JP | 2013-042634 A | 2/2013 |
| JP | 2014-212659 A | 11/2014 |
| JP | 2015-033251 A | 2/2015 |
| JP | 2016-116428 A | 6/2016 |
| JP | 2016-181996 A | 10/2016 |
| JP | 2018-061432 A | 4/2018 |

* cited by examiner

POWER SYSTEM INTERCONNECTION SYSTEM, AND METHOD OF INSTALLING POWER SYSTEM INTERCONNECTION SYSTEM

CROSS-REFERENCE TO RELATED APPLICATIONS

This application is the national phase under 35 U.S.C. § 371 of PCT International Application No. PCT/JP2019/025522 which has an International filing date of Jun. 27, 2019 and designated the United States of America.

FIELD

The present disclosure relates to a power system interconnection system and a method of installing the power system interconnection system.

BACKGROUND

In the market, a shift from a gasoline-powered vehicle or a hybrid vehicle to an electric-powered automobile such as a plug-in hybrid vehicle (PHE) or an electric vehicle (EV) has progressed. Japanese Patent Application Laid-Open No. 2018-61432 discloses vehicle-to-home (V2H) equipment that connects such an electric-powered automobile to an electrical apparatus used at a dowelling house and supplies the electrical apparatus of the dwelling house with power as an emergency power supply at the time of disaster or the like.

Meanwhile, a service for distributing power to an electric power system from an automobile expands from general household use beyond the V2H to the vehicle-to-everything (V2X) that is a general term for the vehicle-to-building (V2B) and the vehicle-to-grid (V2G) that are services for a large number of end users and networks for power.

SUMMARY

The power of a battery mounted on an electric-powered automobile is large while an average operation hour per day of the electric-powered automobile is relatively short.

For this reason, expectations are running high for supplying a load such as an electric power system with power of the electric-powered automobile at the time of a disaster or the like. If, however, some of the electric-powered automobiles move at the time of disaster, the power of the electric-powered automobiles cannot be utilized, which prevents required power from being supplied to the load.

The present disclosure is made in view of such circumstances, and an object is to provide a power system interconnection system, a power system interconnection unit, a power system interconnection method and a method of installing the power system interconnection system that are able to supply a load with required power.

A power system interconnection system according to the present disclosure is a power system interconnection system with an electric power system including a commercial power supply, and comprises a storage battery, an AC-DC power conversion device for the storage battery, a charge and discharge station for an electric-powered automobile and an interconnection control device that are installed on a parking lot, and the interconnection control device supplies a first load with power from at least one of the charge and discharge station and the AC-DC power conversion device in a case where the electric power system is in an emergency situation.

A power system interconnection method according to the present disclosure is a power system interconnection method with an electric power system, and comprises including a storage battery, an AC-DC power conversion device for the storage battery a charge and discharge station for an electric-powered automobile and an interconnection control device that are installed on a parking lot; and supplying a first load with power from at least one of the charge and discharge station and the AC-DC power conversion device in a case where the electric power system is in an emergency situation.

A power system interconnection system according to the present disclosure is a power system interconnection system with an electric power system, and comprises: a charge and discharge station for an electric-powered automobile installed on a parking lot; and a power system interconnection unit installed on the parking lot, and the power system interconnection unit includes a storage battery board containing a storage battery a power conversion board containing an AC-DC power conversion device for the storage battery, and an interconnection board containing an interconnection control device for performing power system interconnection with the electric power system.

A power system interconnection unit according to the present disclosure is a power system interconnection unit with an electric power system, and comprises: a storage battery board that is installed on a parking lot and contains a storage battery; a power conversion board that is installed on the parking lot and contains an AC-DC power conversion device for the storage battery; and an interconnection board that is installed on the parking lot and contains an interconnection control device performing power system interconnection with the electric power system.

A method of installing the power system interconnection system according to the present disclosure is a method of installing the power system interconnection system with an electric power system and comprises: installing, on a base provided on a ground of a parking lot, a storage battery board containing a storage battery a power conversion board containing an AC-DC power conversion device for the storage battery, and an interconnection board containing an interconnection control device that performs power system interconnection with the electric power system so as to be aligned, connecting a cable extending from a commercial power supply through a high voltage cable inlet opening of the interconnection board, connecting a cable extending to a predetermined load through a high voltage cable outlet opening of the interconnection board, and connecting a cable extending from a charge and discharge station for an electric-powered automobile through a low voltage cable outlet opening of the interconnection board.

A power system interconnection system according to the present disclosure is a power system interconnection system with an electric power system including a commercial power supply and comprises a storage battery, an AC-DC power conversion device for the storage battery, a charge and discharge station for an electric-powered automobile, an inverter device for a solar battery and an interconnection control device that are installed on a parking lot, and the interconnection control device supplies a first load with power from at least one of the charge and discharge station as well as the inverter device and the AC-DC power conversion device in a case where the electric power system is in an emergency situation.

A power system interconnection system according to the present disclosure comprises: a charge and discharge station for an electric-powered automobile that is installed on a parking lot; a solar battery that is installed on the parking lot; an inverter device that is installed on the parking lot and converts direct current output from the solar battery to alternating current; and a power system interconnection unit that is installed on the parking lot, and the power system interconnection unit includes a storage battery board containing a storage battery, a power conversion board containing an AC-DC power conversion device for the storage battery and an interconnection board containing an interconnection control device performing power system interconnection between the electric power system and the charge and discharge station or the inverter device.

A power system interconnection unit according to the present disclosure is a power system interconnection unit with an electric power system, and comprises: a storage battery board that is installed on a parking lot and contains a storage battery; a power conversion board that is installed on the parking lot, and contains an AC-DC power conversion device for the storage battery, and an interconnection board that is installed on the parking lot, and contains an interconnection control device performing power system interconnection between the electric power system and the charge and discharge station or the inverter device.

A power system interconnection method according to the present disclosure is a power system interconnection method with an electric power system, and comprises: including a storage battery, an AC-DC power conversion device for the storage battery, a charge and discharge station for an electric-powered automobile, a solar battery an inverter device for the solar battery and an interconnection control device that are installed on a parking lot; and supplying a predetermined load with power from at least one of the charge and discharge station as well as the inverter device and the AC-DC power conversion device in a case where the electric power system is in an emergency situation.

A method of installing a power system interconnection system according to the present disclosure is a method of installing a power system interconnection system with an electric power system and comprises: installing on a base provided on a ground of a parking lot a storage battery board containing a storage battery, a power conversion board containing an AC-DC power conversion device for the storage battery, and an interconnection board containing an interconnection control device that performs power system interconnection with the electric power system so as to be aligned. The method further comprises connecting a cable extending from a commercial power supply through a high voltage cable inlet opening of the interconnection board, connecting a cable extending to a predetermined load through a high voltage cable outlet opening of the interconnection board, and connecting a cable extending from a charge and discharge station for an electric-powered automobile and a cable extending from an inverter device for a solar battery through a low voltage cable outlet opening of the interconnection board.

According to the present disclosure, it is possible to supply a load with required power.

The above and further objects and features of the invention will more fully be apparent from the following detailed description with accompanying drawings.

Embodiment 1 and Embodiment 2

Figure 1:
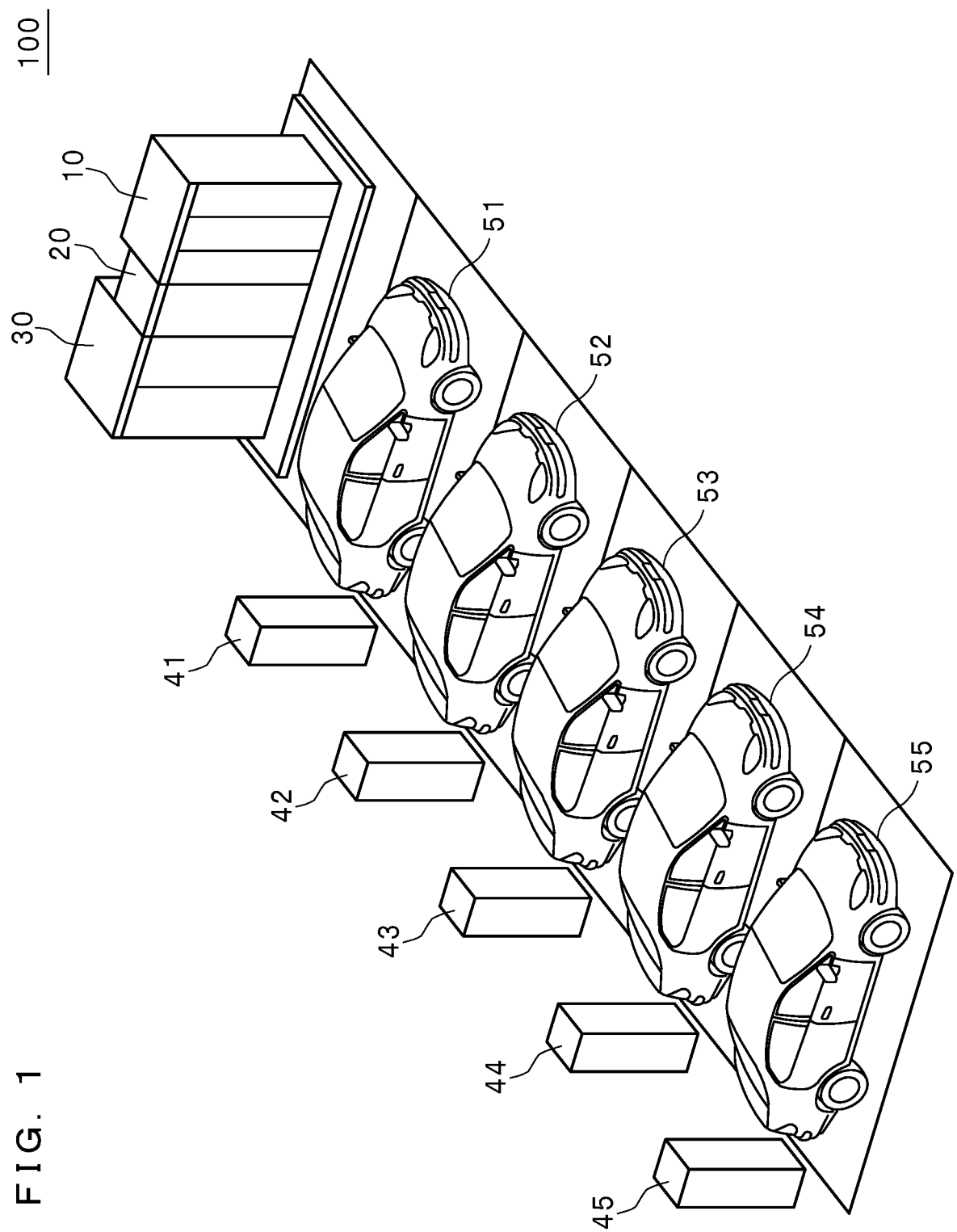
FIG. 1 is a schematic view illustrating one example of an external configuration of a power system interconnection system according to an embodiment of the present invention.

The present invention will be described below with reference to the drawings depicting embodiments thereof. FIG. 1 is a schematic view illustrating one example of an external configuration of a power system interconnection system 100 according to the present embodiment. In the example of FIG. 1, a parking lot has parking spaces for five vehicles. The power system interconnection system 100 includes charge and discharge stations 41, 42, 43, 44 and 45 for respective electric-powered automobiles (51, 52, 53, 54 and 55) installed on the parking lot and a power system interconnection unit installed on the parking lot. The power system interconnection system 100 can be provided as equipment for a business continuity plan (BCP). The power system interconnection unit includes a storage battery board 10 containing a storage battery (not illustrated), a power conversion board 20 containing a storage battery power conditioning system (PCS) (not, illustrated) and an interconnection board 30 containing an interconnection control device (not illustrated) that performs power interconnection with an electric power system. Note that the number of charge and discharge stations is not limited to five.

The electric-powered automobile includes a plug-in hybrid electric vehicle (PHEV) or an electric vehicle (EV) and is also referred to as MEV or EV in the specification. Each of the charge and discharge stations 41-45 can charge and discharge a battery (on-vehicle storage battery) mounted on the electric-powered automobile. The storage battery PCS (also referred to as an AC-DC power conversion device) contained in the power conversion board 20 can bidirectionally convert power from alternating current to direct current and from direct current to alternating current, and can charge and discharge the storage battery (also referred to as a stationary storage battery) contained in the storage battery board 10. The interconnection control device contained in the interconnection board 30 performs power system interconnection operation between the electric power system and the storage battery PCS as well as the charge and discharge stations 41-45 in the case where the electric power system is in a normal situation and performs autonomous operation by the storage battery PCS and the charge and discharge stations 41-45 in the case where the electric power system is in an abnormal situation (when a disaster occurs).

The charge and discharge stations 41-45, the storage battery board 10, the power conversion board 20 and the interconnection board 30 (power system interconnection unit) are installed on the parking lot. Even if required power cannot be supplied from the charge and discharge stations 41-45 to a predetermined load (also referred to as an important load or a first load) since all or part of the electric-powered automobiles are moving and are thus not in the parking lot at the time of a disaster, power in the storage battery can be supplied to the load by the storage battery PCS, and thus required power can be supplied to the load as a whole.

Figure 2:
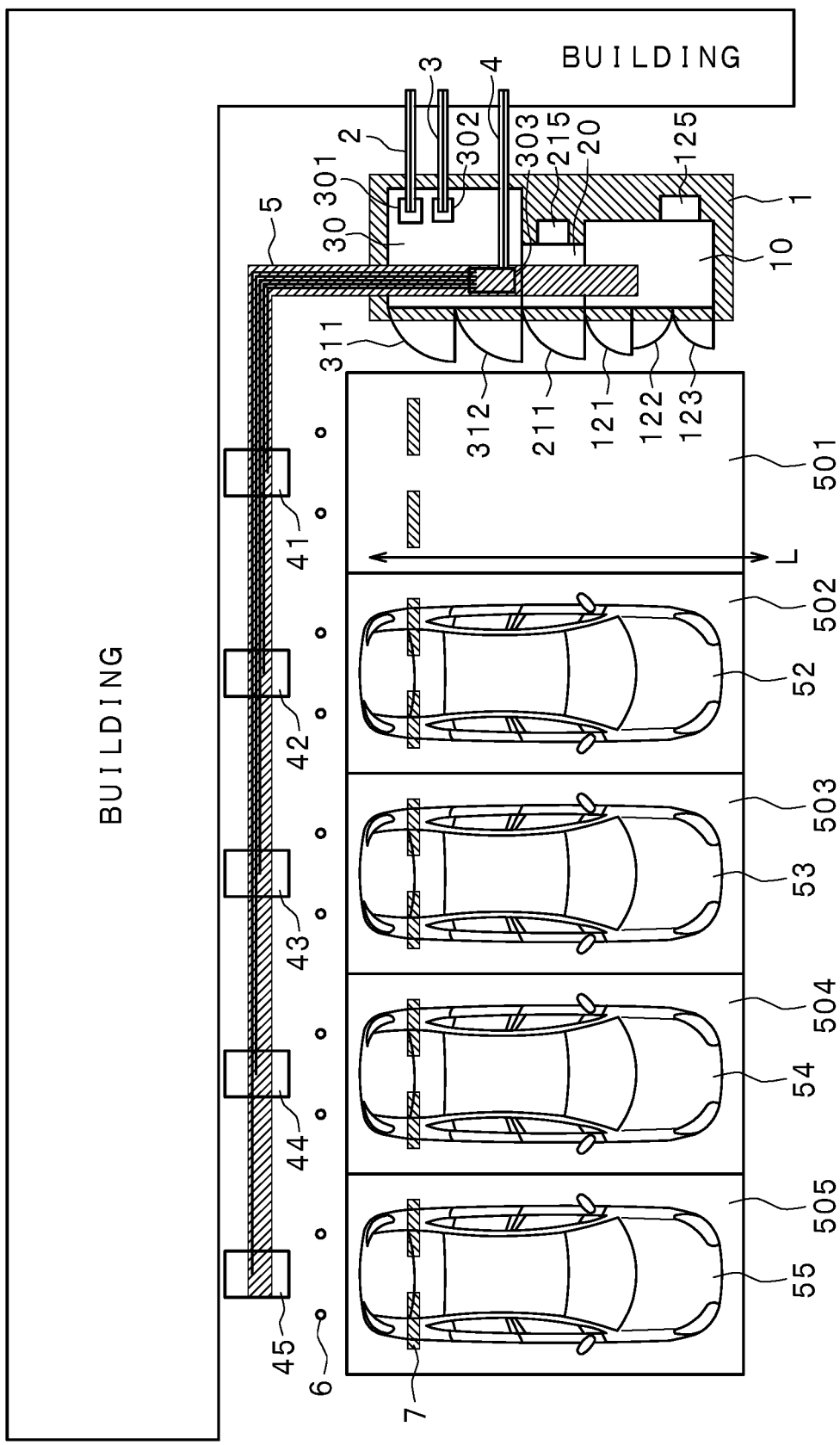
FIG. 2 is a plan view illustrating one example of installation of the power system interconnection system according to the present embodiment.
Figure 3:
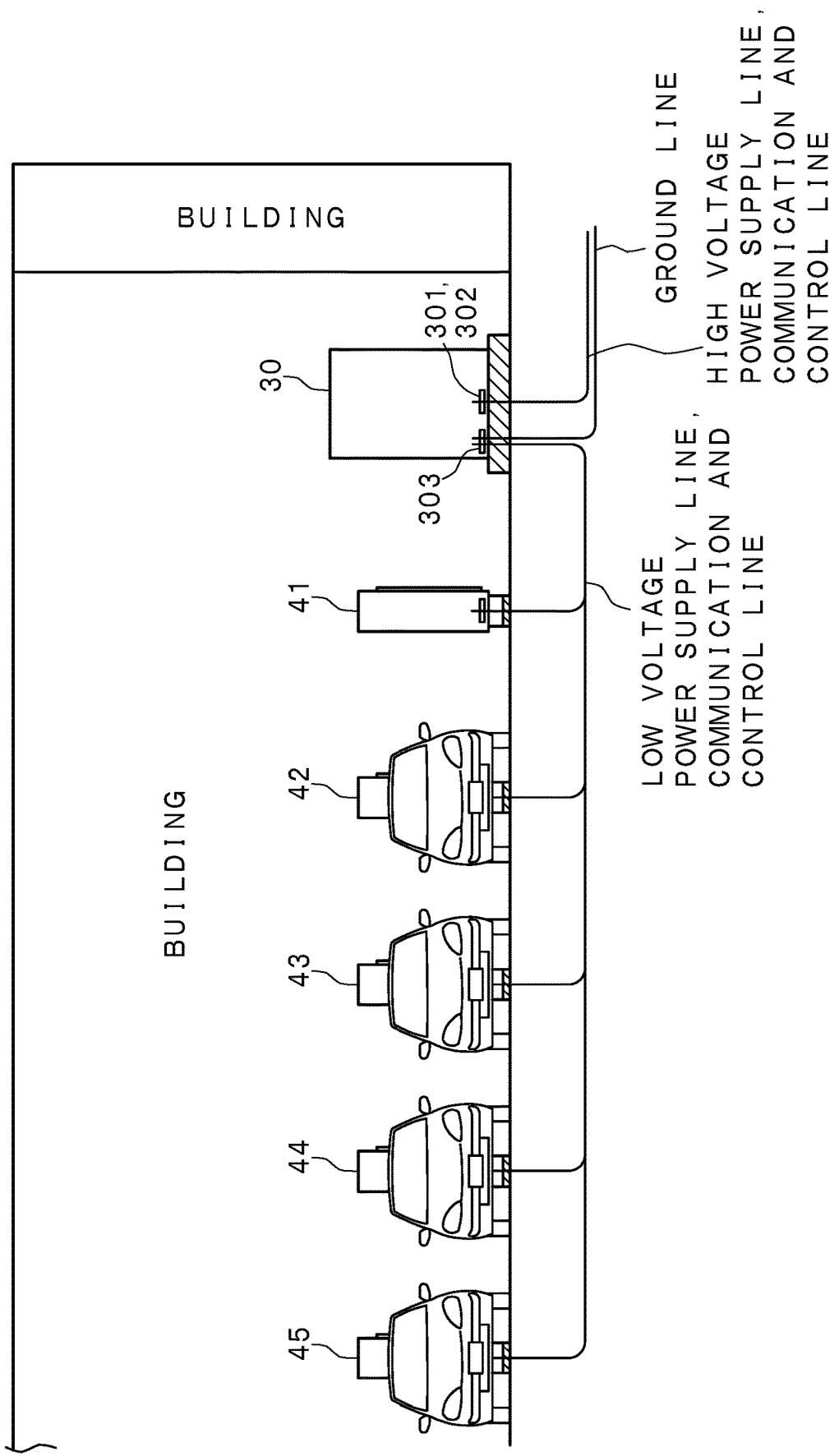
FIG. 3 illustrates an elevation view illustrating one example of installation of the power system interconnection system according to the present embodiment.

FIG. 2 is a plan view illustrating one example of installation of the power system interconnection system 100 according to the present embodiment. FIG. 3 illustrates an elevation view illustrating one example of installation of the power system interconnection system 100 according to the present embodiment. In the example of the drawing, an electric-powered automobile to be parked at the parking space 501 out of the five parking spaces 501-505 is assumed to be absent. The reference code 6 represents a collision prevention pole while the reference code 7 represents a wheel stopper.

As illustrated in FIG. 2, the storage battery board 10, the power conversion board 20 and the interconnection board 30 are arranged so as to be aligned along the direction of the length of a vehicle (the direction denoted by the reference code L in the drawing). That is, the storage battery board 10, the power conversion board 20 and the interconnection board 30 can be installed so as to be aligned in the direction of the vehicle length of the parking space. The storage battery board 10, the power conversion board 20, and the interconnection board 30 are arranged so as to be aligned in the direction of the vehicle length of the parking space arranged in parallel for each electric-powered automobile in the parking lot, whereby the power system interconnection unit (the storage battery board. 10, the power conversion board 20 and the interconnection board 30) can be arranged in a parking space having a size of approximately one electric-powered automobile, for example, which can reduce the ground area required for the parking lot inclusive of the power system interconnection unit. Moreover, the distance between the power system interconnection unit and the charge and discharge stations 41-45 can be shortened, which can facilitate wiring work and burying work of a power line and a communication and control line to be described later, and reduce the cost of such works.

The storage battery board 10 has openable doors 121, 122 and 123 at the front surface on the same side as the parking space. The power conversion board 20 has an openable door 211 at the front surface on the same side as the parking space. The interconnection board 30 has openable doors 311 and 312 at the front surface on the same side as the parking space. That is, the storage battery board 10, the power conversion board 20 and the interconnection board 30 can be installed such that the respective openable doors provided in the storage battery board 10, the power conversion board 20 and the interconnection board 30 face toward the parking space. A worker can open the openable doors for working when performing maintenance and checkups on the storage battery board 10, the power conversion board 20 and the interconnection board 30.

As illustrated in FIG. 2, for example, the electric-powered automobile parked in the parking space 501 adjacent to the respective openable doors of the storage battery board 10, the power conversion board 20 and the interconnection board 30 is moved from the parking space 501 to make this parking space 501 available, which allows this parking space 501 to be utilized for a working space to perform maintenance and checkup on the power system interconnection unit. This can eliminate the need for installing the power system interconnection unit while the work space for maintenance and checkup is previously ensured, and reduce the area taken up by the power system interconnection unit inclusive of the work space.

The storage battery board 10 is provided with an air intake and exhaust opening 125 at the rear surface on the side opposite to the parking space. The power conversion board 20 is provided with an air intake and exhaust opening 215 at the rear surface on the side opposite to the parking space. The storage battery board 10 contains a cooling device and a heater (not illustrated) for managing the temperature of the storage battery other than the storage battery. The power conversion board 20 contains a cooling device (not illustrated) for heat dissipation of the storage battery PCS other than the storage battery PCS. The provision of the air intake and exhaust openings at the rear surface on the side opposite to the parking space can prevent hot air from being blown to the user at the parking space and can avoid making the user feel uncomfortable.

Each of the storage battery board 10, the power conversion hoard 20 and the interconnection hoard 30 can have a plate thickness of 2.3 mm or more. Generally for cubicle type high voltage receiving equipment (hereinafter also simply referred to as a cubicle), a metal plate being approximately 1.6 mm in thickness is used. In this case, under a fire prevention ordinance, the cubicle needs to be installed 3 meters (m) or more away from the building. Setting the plate thickness to 2.3 mm or more eliminates the restriction on the clearance from the building of 3 m or more. This allows the power system interconnection unit to be installed without taking into account the restriction on the clearance from a building even in the parking lot adjacent to buildings, which enables greater freedom of installation of the power system interconnection unit, resulting in easy installation.

As illustrated in FIG. 2, the interconnection board 30 has a high voltage cable inlet 301 and a high voltage cable outlet 302 near the rear surface on the bottom plate and a low voltage cable outlet 303 near the front surface on the bottom plate. Into the high voltage cable inlet 301, a power line (high voltage power supply line) extending from a commercial power supply side of the electric power system and a communication and control line that are wired through conduit tubes (for example, hard polyethylene tube having plasticity) buried in the ground are led by a suitable length. Into the high voltage cable outlet 302, a power line (high voltage power supply line) extending from a load side and a communication and control line that are wired through conduit tubes buried in the ground are led by a suitable length. Into the low voltage cable outlet 303, a ground line, power lines (low voltage power supply line) extending from the charge and discharge stations 41-45 and a communication and control line that are wired through conduit tubes buried in the ground are led by a suitable length.

Figure 4:
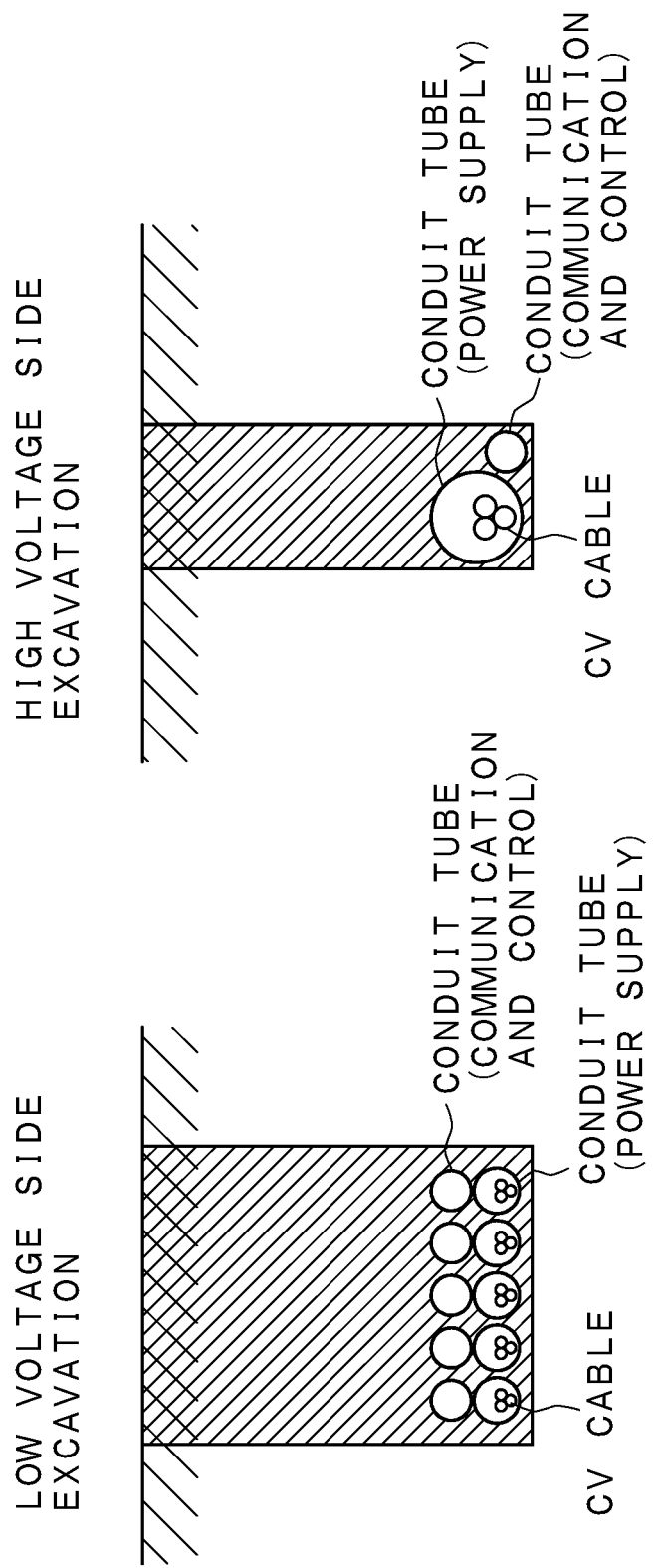
FIG. 4 is a schematic view illustrating one example of conduit tubes buried in the ground.

FIG. 4 is a schematic view illustrating one example of conduit tubes buried in the ground. In FIG. 4, the drawing on the left illustrates an excavation example on the low-voltage side while the drawing on the right illustrates an excavation example on the high-voltage side. On the low-voltage side, five power lines (for example, CV cables: cross-linked polyethylene insulated vinyl sheath cable, are wired in respective five conduit tubes associated with five charge and discharge stations while communication and control lines are wired in respective five conduit tubes associated with the five charge and discharge stations. The respective conduit tubes are buried under the ground at a required depth (for example, 60 cm or deeper). On the high-voltage side, a power line (for example, CV cable) is wired in the conduit tube while a communication and control line is wired in another conduit tube. These conduit tubes are buried under the ground at a required depth (for example, 60 cm or deeper).

The power system interconnection system 100 according to the present embodiment can be installed as described below. That is, the storage battery board 10, the power conversion board 20 and the interconnection board 30 are installed so as to be aligned on a base 1 provided on the ground of the parking lot. Base bolts fixed to the base 1 are threaded through bolt holes formed on the bottom plate (not illustrated) of each of the storage battery board 10, the power conversion board 20 and the interconnection board 30 and fastened by nuts to thereby secure the storage battery board 10, the power conversion board 20 and the interconnection board 30 to the base 1.

The power system interconnection unit is divided into three installation boards such as the storage battery board 10, the power conversion board 20 and the interconnection board 30. This eliminates the need for a large transport vehicle when the storage battery board 10, the power conversion board 20 and the interconnection board 30 are carried in an installation site. This also eliminates the need for large heavy equipment when the storage battery board 10, the power conversion board 20 and the interconnection board 30 are lifted and moved to an installation site. Especially, in a shopping mall where an indefinite number of customers come and go, this can prevent the customers from having inconvenience and a bad impression when these boards are installed at a parking lot. In addition, this can achieve compact device installation by making effective use of the limited space of the parking lot.

Furthermore, a cable extending from a commercial power supply is connected through the high voltage cable inlet 301 of the interconnection board 30, a cable extending to a predetermined load is connected through the high voltage cable outlet 302 of the interconnection board 30, and cables extending from the charge and discharge stations 41-45 are connected through the low voltage cable outlet 303 of the interconnection board 30. The cables include a power line and a communication and control line. The length of the low-voltage side wires and the length of the communication and control line are presumable from a package design of the power system interconnection unit, and thus the previously-processed wire can be prepared in advance.

The above-described configuration enables an installation work of the power system interconnection unit in a relatively short time, which can reduce the construction cost.

Furthermore, the multiple charge and discharge stations 41-45 can be installed so as to be aligned on the base 1 provided on the ground for the parking lot. The power system interconnection unit is installed adjacent to the parking space to thereby shorten the distance between the power system interconnection unit and the charge and discharge stations 41-45, which can facilitate wiring work and burying work of the power line and the communication line and reduce the cost of such works.

Figure 5:
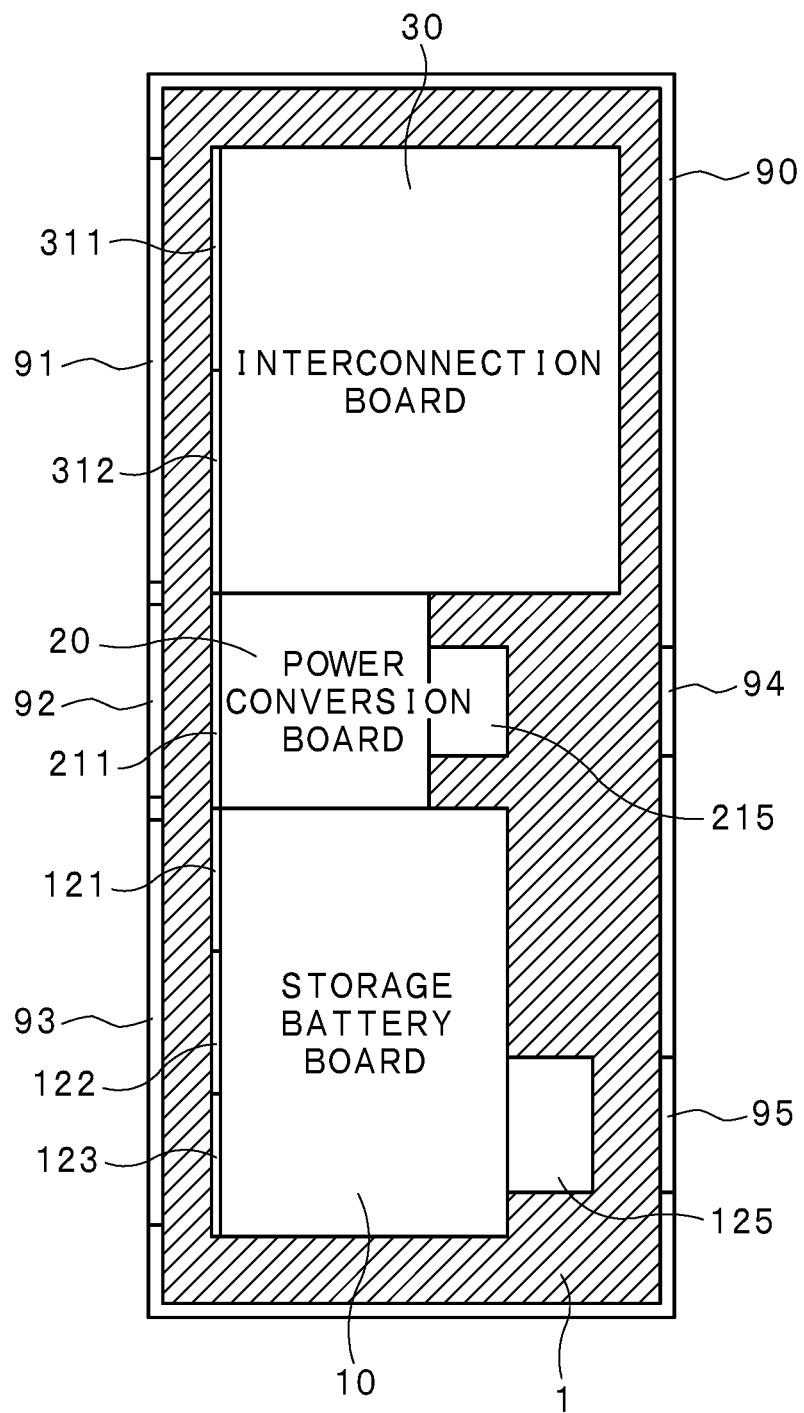
FIG. 5 is a plan view illustrating an arrangement example of a decorative wall installed so as to surround the power system interconnection unit.

FIG. 5 is a plan view illustrating an arrangement example of a decorative wall 90 installed around the periphery of the power system interconnection unit. As illustrated in FIG. 5, the decorative wall 90 can be fixed to the base 1 on which the storage battery board 10, the power conversion board 20 and the interconnection board 30 are installed so as to surround the storage battery board 10, the power conversion board 20 and the interconnection board 30. The decorative wall 90 can be used as a message sign on which an advertisement, an art, etc. are displayed. The decorative wall 90 can be built high enough to prevent the storage battery board 10, the power conversion board 20 and the interconnection board 30 from showing. The appearances of the storage battery board 10, the power conversion board 20 and the interconnection board 30 are highly likely to give a sense of discomfort to the user in a shopping mall and the public place. If the storage battery board 10, the power conversion board 20 and the interconnection board 30 are surrounded by the decorative wall 90, the user may feel no discomfort and receive information that attracts the interest of the user.

A gate 93 is provided at the front surface of the decorative wall 90 on the same side as the parking space at a position corresponding to the openable doors 121, 122 and 123 of the storage battery board 10. A gate 92 is provided at the front surface of the decorative wall 90 on the same side as the parking space at a position corresponding to the openable door 211 of the power conversion board 20. Furthermore, a gate 91 is provided at the front surface of the decorative wall 90 on the same side as the parking space at a position corresponding to the openable doors 311 and 312 of the interconnection board 30. The gates 91-93 each may be a doorway that can be opened/closed or may be a detachable section. This makes it possible to perform maintenance and checkup on the storage battery board 10, the power conversion board 20 and the interconnection board 30 even if the storage battery board 10, the power conversion board 20 and the interconnection board 30 are surrounded by the decorative wall 90.

An opening 95 is provided at the rear surface of the decorative wall 90 on the side opposite to the parking space at a position corresponding to the air intake and exhaust opening 125 of the storage battery board 10. Furthermore, an opening 94 is provided at the rear surface of the decorative wall 90 on the side opposite to the parking space at a position corresponding to the air intake and exhaust opening 215 of the power conversion board 20. The openings 94 and 95 may include punching, slits or the like. The provision of the openings 94 and 95 enables cooling of the storage battery board 10, the power conversion board 20 and the interconnection board 30 even if the storage battery board 10, the power conversion board 20 and the interconnection board 30 are surrounded by the decorative wall 90.

In the example of FIG. 5, though the decorative wall. 90 is configured to surround the storage battery board 10, the power conversion board 20 and the interconnection board 30 through the four faces, the configuration of the decorative wall 90 is not limited thereto. For example, two out of the four faces thereof may be covered. If only the two faces are covered, for example, the storage battery board 10 side and the rear face side can be covered. The storage battery board 10 side is most likely to attract a person's attention while the rear surface side is conspicuous due to the irregularities in the size among the respective boards.

Furthermore, covering the two faces can be more cost-effective compared to covering the four faces.

In the example of FIG. 2, though the storage battery board 10, the power conversion board 20 and the interconnection board 30 are configured to be aligned in the position adjacent to the parking space 501 at an end of the five parking spaces 501-505, the installation is not limited to the example of FIG. 2. For example, the storage battery board 10, the power conversion board 20 and the interconnection board 30 may be aligned in a section having a size corresponding to approximately one vehicle of the parking space that has been provided between the parking spaces 502 and 503.

Figure 6:
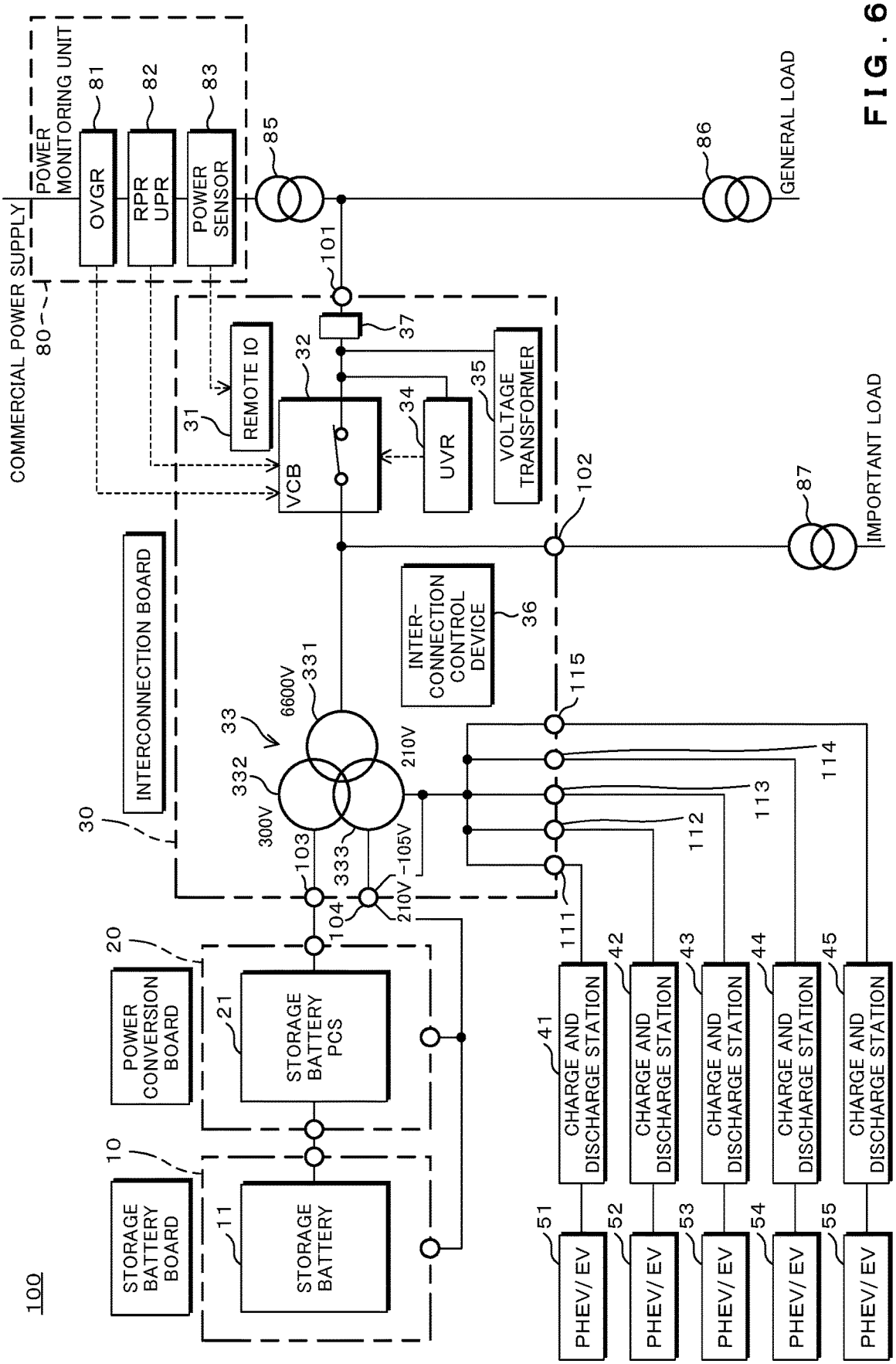
FIG. 6 is a schematic view illustrating one example of a circuit configuration of the power system interconnection system according to the present embodiment.

FIG. 6 is a schematic view illustrating one example of the circuit configuration of the power system interconnection system 100 according to the present embodiment. The storage battery board 10 contains a storage battery (stationary storage battery) 11 as well as a control device, a cooling device, a heater and the like that are not illustrated. The power conversion board 20 contains the storage battery PCS 21 as well as a control device, a cooling device and the like that are not illustrated. The interconnection board 30 includes a remote IO 31, a VCB 32 functioning as a switch unit, a transformer 33, a UVR 34, a voltage transformer 35, etc. other than the interconnection control device 36.

The interconnection board 30 includes terminal blocks 101 and 102, and breakers 103, 104 and 111-115. The terminal block 101 is provided at a current path on the high voltage cable inlet side (high voltage power supply line). That is, the terminal block 101 is connected to a power line extending from the secondary side of a step-down transformer 85 of the electric power system and a power line extending from the primary side of a step-down transformer 86 connected to a general load (second load). The general load here includes electric equipment that is relatively less affected even if power is shut off at the time of a disaster, for example.

The terminal block 102 is provided at a current path on the high voltage cable outlet side (high voltage power supply line). That is, the terminal block 102 is connected to a power line extending from the primary side of a step-down transformer 87 connected to an important load (first load). The important load here is an important load that needs to be continuously supplied with power even at the time of a disaster and includes, for example, an emergency elevator, electric equipment needing continuous operation, lighting and air-conditioning equipment in a building, etc.

The terminal block 101 is connected to one of the electrodes in the VCB 32, the UVR 34 and the voltage transformer 35 via a disconnecting switch 37. The voltage transformer 35 will be described later. The VCB 32 is a vacuum circuit breaker, and is a circuit breaker having electrodes in a high-vacuum container that diffuses in high vacuum the material made of arcing developed between the electrodes when current is interrupted, and dissipates the arcing.

The UVR 34 is an undervoltage relay and can detect abnormality such as short circuits, power failure or the like on the electric power system side. If detecting an abnormality, the UVR 34 outputs a control signal to the VCB 32 to thereby shut off the current path of the VCB 32.

Furthermore, for a building on which management of electric power demand is performed using the power system interconnection system, a power monitoring unit 80 for monitoring power on the primary side of the step-down transformer 85 is provided. Note that the power monitoring unit 80 is not necessarily provided. Alternatively, if the step-down transformer 85 is not provided, a site to be monitored by the power monitoring unit 80 is appropriately set. The power monitoring unit 80 includes an OVGR 81, an RPR/UPR 82 and a power sensor 83. The OVGR 81 is a ground overvoltage relay and continuously detects a ground fault of the electric power system. The RPR/UPR 82 is a reverse power relay and an underpower relay and can detect an abnormality such as reverse power flow to the electric power system side, short circuits or the like. In the case where an abnormality is detected by the OVGR 81 or the RPR/UPR 82 as well, the current path of the VCB 32 is shut off.

The remote IO 31 is an AD converter for converting power (analog value) detected by the power sensor 83 to a digital value and outputs the converted power (digital value) to the interconnection control device 36.

The other electrode in the VCB 32 is connected to the transformer 33 (more specifically a first winding 331) through a current path. The transformer 33 includes the first winding 331, a second winding 332 connected to the breaker 103 through a current path and a third winding 333 connected to the breakers 111-115 through current paths.

In other words, the transformer 33 can be a three-phase transformer with three windings. The voltage and the power (apparent power) on the first winding 331 side can be assumed as 6600 V and 50 kVA, respectively, for example, the voltage and the power on the second winding 332 side can be assumed as 300 V and 50 kVA, respectively, for example, and the voltage and power on the third winding 333 side can be assumed as 210 V and 50 kVA, respectively, for example. The voltage and power are not limited to these values. The employment of the transformer with three-windings as the transformer 33 may save space and reduce weight in comparison with provision of two transformers.

The breaker 103 is connected to the storage battery PCS 21. The storage battery PCS 21 can bidirectionally convert power from alternating current to direct current and from direct current to alternating current, and can charge and discharge the storage battery 11.

The breaker 104 is connected to a current path for one of the three phases of the third winding 333. For example, voltage of 105 V-210 V is supplied as a power source for the control device and the cooling device in the power conversion board 20 and supplied as a power source for the control device, the cooling device and the heater in the storage battery hoard 10.

The breakers 111-115 are connected to the power lines extending from the charge and discharge stations 41-45, respectively. The charge and discharge stations 41-45 have respective conversion circuits capable of bidirectionally converting power from alternating current to direct current and from direct current to alternating current, and can charge and discharge the respective batteries mounted on the electric-powered automobiles 51-55.

The charge and discharge stations 41-45 are provided with respective report units (not illustrated, that report information on charge or discharge of the batteries of the electric-powered automobiles 51-54. Each of the report units may be a display panel or an indicator light or may report the information to a terminal device used by the user or the manager via a wireless communication, for example. The information on charge or discharge may include, for example, the state of operation such as during preparation for charge or discharge, preparation completed, during charging and discharging, charging and discharging completed, etc., the state of charge (SOC) of a battery a time required for full charge, a remaining time until full charge, a dischargeable amount, a fee for charge and discharge, etc. This can timely report the information on the charge and discharge of the electric-powered automobile.

The power system interconnection method according to the power system interconnection system 100 of the present embodiment will be described.

Figure 7:
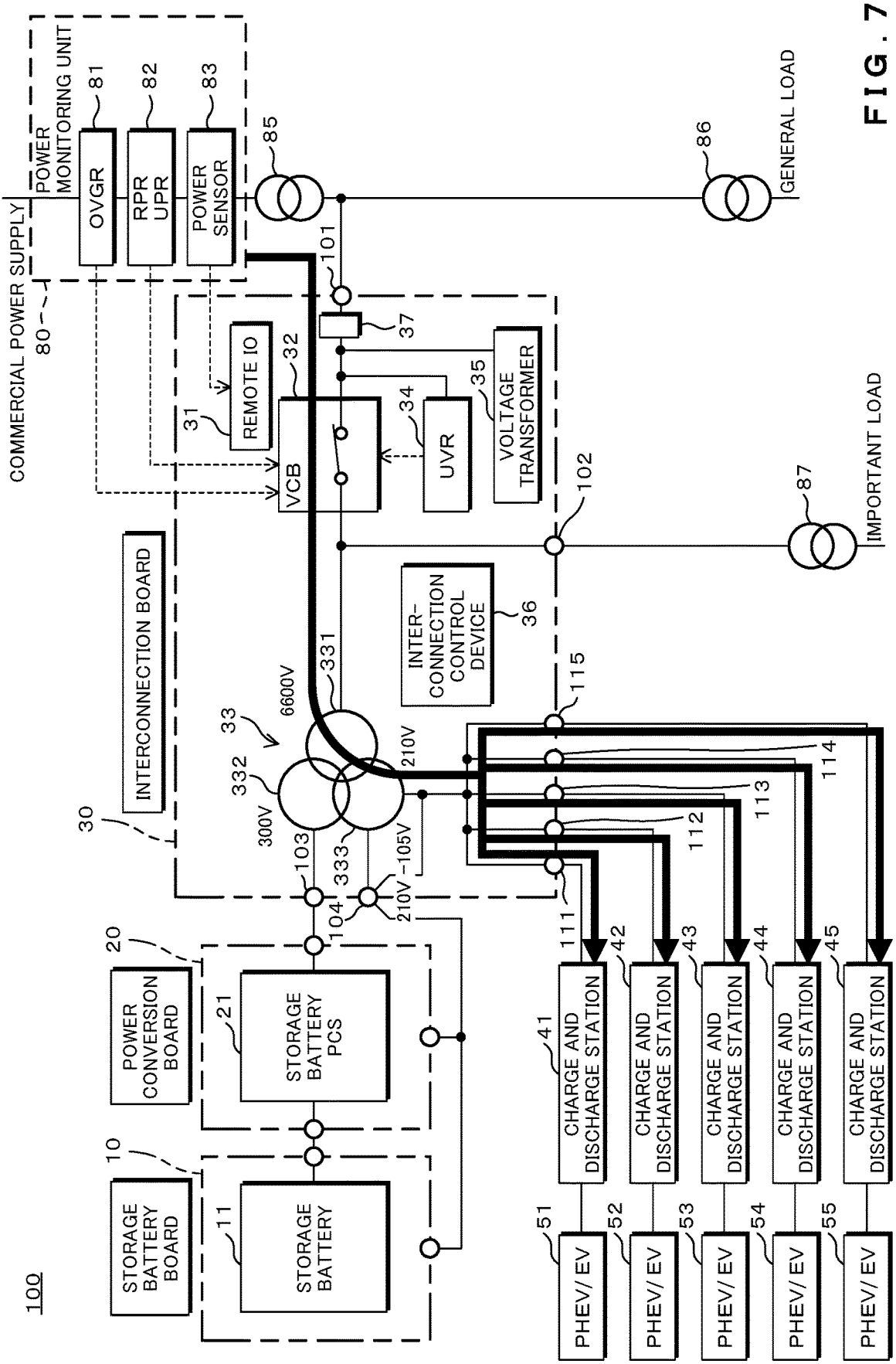
FIG. 7 is a schematic view illustrating a first example of the power system interconnection in the case where an electric power system by the power system interconnection system according to the present embodiment is in a normal situation.

FIG. 7 is a schematic view illustrating a first example of the power system interconnection in the case where an electric power system by the power system interconnection system 100 according to the present embodiment is in the normal situation. The interconnection control device 36 can charge the electric-powered automobiles 51-55 by the charge and discharge stations 41-45, respectively, in the state where the electric power system is in the normal situation and where a charge mode is set. This makes it possible to utilize the power system interconnection system 100 as fast charging stations for the electric-powered automobiles.

Though not illustrated, power is supplied from the commercial power supply to the important load in the case where the electric power system is in the normal situation while power is supplied from the commercial power supply to the general load in the case where the electric power system is in the normal situation.

The load is separated into two systems of the general load and the important load to thereby make the power supplied at the time of a disaster to be described later to a minimum required amount, which enables continuous power supply to the important load and extension of the time capable of supplying the important load with power.

Figure 8:
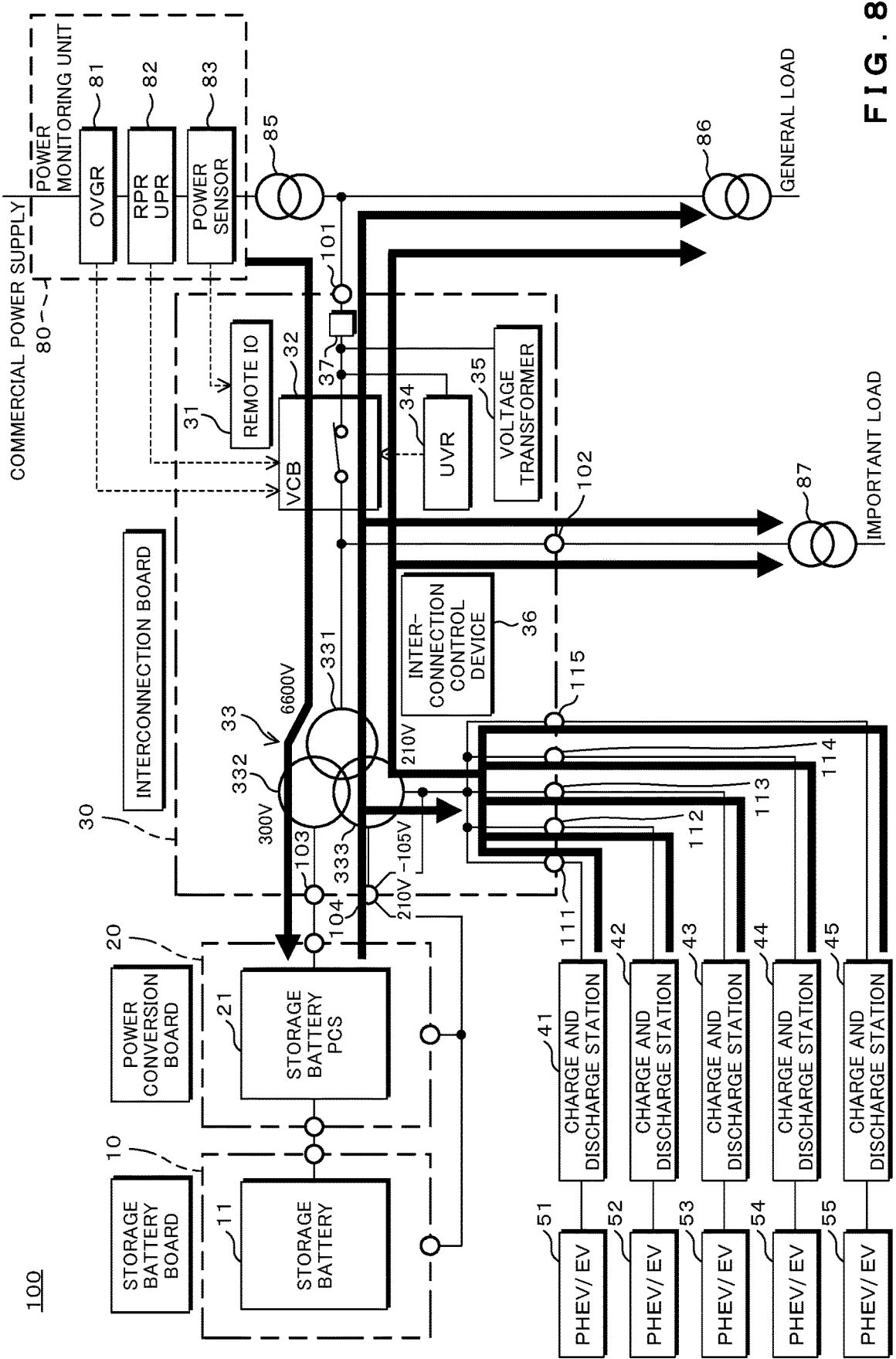
FIG. 8 is a schematic view illustrating a second example of the power system interconnection in the case where the electric power system by the power system interconnection system according to the present embodiment is in the normal situation.

FIG. 8 is a schematic view illustrating a second example of the power system interconnection in the case where the electric power system by the power system interconnection system 100 according to the present embodiment is in the normal situation. In the state where the electric power system is in the normal situation and where an energy management mode (also abbreviated as an enemane mode) is set, if the power-receiving point power measured at a predetermined site is equal to or more than a threshold, that is, if the power detected by the power sensor 83 is equal to or more than a threshold, the interconnection control device 36 supplies the important load and the general load with power from the charge and discharge stations 41-45 or supplies the important load and the general load with power from the storage battery PCS 21 such that the power detected by the power sensor 83 is equal to or less than the threshold. This enables peak-cut operation of power. Note that in the case where the power-receiving point power measured at a predetermined site is equal to or less than the threshold, power, which is less than a threshold, can be supplied from the electric power system to the charge and discharge stations 41-45 or the storage battery PCS 21.

Figure 9:
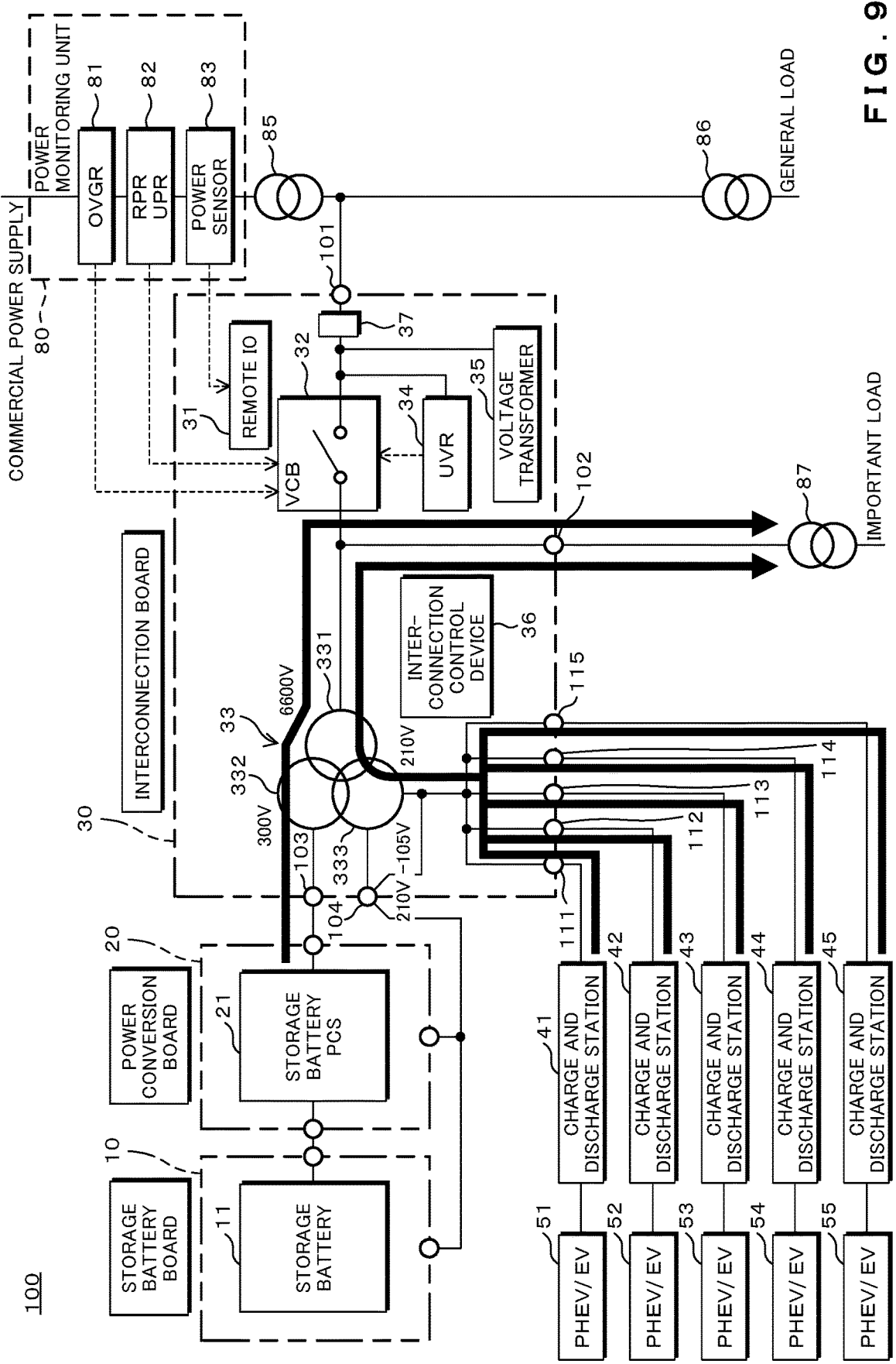
FIG. 9 is a schematic view illustrating one example of autonomous operation in the case where the electric power system by the s power system interconnection system according to the present embodiment is in an emergency situation.

FIG. 9 is a schematic view illustrating one example of autonomous operation in the case where the electric power system by the power system interconnection system 100 according to the present embodiment is in an emergency situation. The interconnection control device 36 disconnects the commercial power supply from the important load by opening the electrodes in the VCB 32 in the case where the electric power system is in the emergency situation. Power is supplied from the charge and discharge stations 41-45 or the storage battery PCS 21 in this state, whereby the autonomous operation by the interconnection control device 36 can be made.

The interconnection control device 36 can supply power from at least one of the charge and discharge stations 41-45 and the storage battery PCS 21 to the important load in the case where the electric power system is in the emergency situation.

In the case where the interconnection control device 36 performs the autonomous operation, the storage battery PCS 21 performs voltage control and operates as a voltage source. Current needed to obtain required power is achieved by the charge and discharge stations 41-45 operating as a current source while being connected to the storage battery PCS 21 operating as the voltage source.

According to the above-mentioned configuration, even if required power cannot be supplied from the charge and discharge stations 41-45 to the important load since some of the electric-powered automobiles are moving at the time of a disaster, power can be supplied from the storage battery PCS 21 to the important load, and thus required power can be supplied to the important load of the electric power system as a whole.

More specifically in the case where the electric power system is in the emergency situation, if power that the charge and discharge stations 41-45 are able to supply is more than the capacity of the important load, the interconnection control device 36 supplies the excess of the power from the charge and discharge stations 41-45 to the storage battery PCS 21. This enables effective use of the power of the electric-powered automobile if some of the electric-powered automobiles are parked in the parking space and are not moving.

Alternatively, in the case where the electric power system is in the emergency situation, if power that the charge and discharge stations 41-45 are able to supply is less than the capacity of the important load, the interconnection control device 36 supplies the important load with power from both of the charge and discharge stations 41-45 and the storage battery PCS 21. For example, assuming that the capacity of the important load is 50 kVA, in the case where power of 30 kVA can be supplied from the charge and discharge stations 41-45 in total, power of 20 kVA is supplied from the storage battery PCS 21 to thereby supply the important load with power of 50 kVA from the high-voltage side of the transformer 33. If the capacity of the important load is varied, power suitable for the capacity of the important load can be supplied. This makes it possible to supply a deficient amount of power from the storage battery PCS 21 if all or part of the required electric-powered automobiles are moving and are not in the parking space, resulting in supply of required power to the important load of the electric power system.

Figure 10:
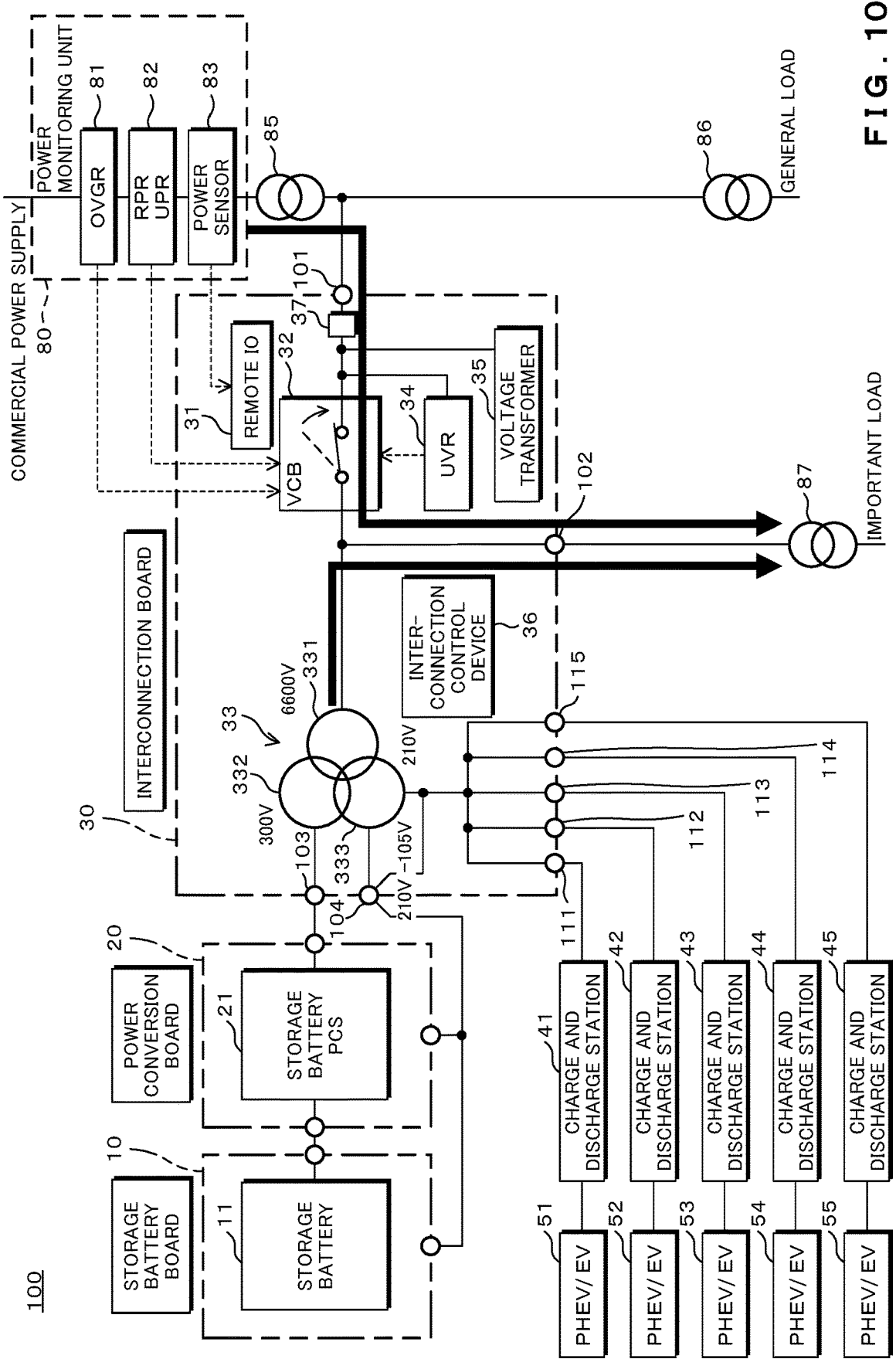
FIG. 10 is a schematic view illustrating one example of operation switching in the case where the electric power system by the power system interconnection system according to the present embodiment is restored from the emergency situation to the normal situation.

FIG. 10 is a schematic view illustrating one example of operation switching in the case where the electric power system by the power system interconnection system 100 according to the present embodiment is restored from the emergency situation to the normal situation. The interconnection control device 36 makes an uninterruptible switching from power supplied from at least one of the charge and discharge stations 41-45 and the storage battery PCS 21 to the important load to power supplied from the commercial power source if the electric power system is restored. The uninterruptible switching can supply the important load with power from the commercial power supply by, for example, detecting the phase of the commercial power supply by the voltage transformer 35, and closing the electrodes in the VCB 32 at the timing when the phase of the storage battery PCS is synchronized with the phase of the commercial power supply.

After the commercial power supply is uninterruptibly reconnected to the important load, the interconnection control device 36 stops the operation of the charge and discharge stations 41-45 and the storage battery PCS 21, and ends the autonomous operation. The storage battery PCS 21 performs voltage control, which enables the uninterruptible switching. Then, the interconnection control device 36 can restart the charge and discharge stations 41-45 and the storage battery PCS 21 in order to perform power system interconnection. The uninterruptible switching by synchronizing the phases allows for stable power supply to the important load.

In the above-described embodiment, though the interconnection of the electric power system is configured to be performed at high voltage of 6600 V, the voltage is not limited thereto. The interconnection may be performed at low voltage. In the case where the interconnection is performed at low voltage, which needs to be 50 kVA or less, the voltage and power (apparent power) on the first winding 331 side of the transformer 33 can be, for example, 210 V and 49 kVA, respectively, the voltage and power (apparent power) on the second winding 332 side of the transformer 33 can be, for example, 300 V and 49 kVA, respectively, and the voltage and power (apparent power) on the third winding 333 side of the transformer 33 can be, for example, 210 V and 49 kVA, respectively. In addition, the transformer may be configured with two transformers with two windings without being limited to a transformer with three windings.

Third Embodiment

Figure 11:
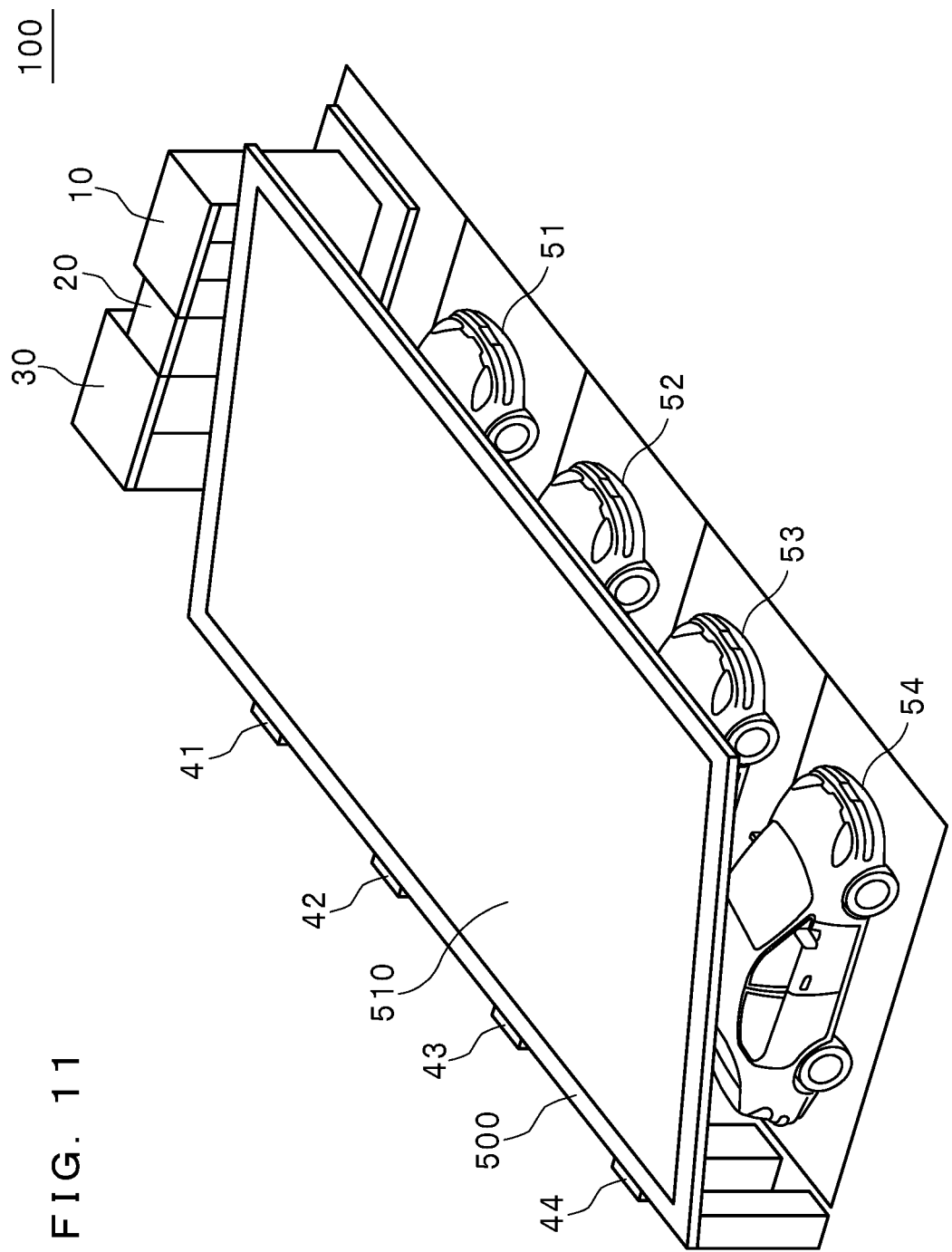
FIG. 11 is a schematic view illustrating one example of an external configuration of the power system interconnection system according to a present embodiment.

FIG. 11 is a schematic view illustrating one example of an external configuration of the power system interconnection system 100 according to a present embodiment. In the example of FIG. 11, the parking lot includes parking spaces for four vehicles. In the parking lot, a carport 500 is installed while a solar battery (solar panel) 510 is mounted on the top surface of the carport. The power system interconnection system 100 includes charge and discharge stations 41, 42, 43 and 44 used for respective electric-powered automobiles (51, 52, 53 and 54) that are installed on the parking lot, an inverter device 520 to be described later used for the solar battery 510 that is installed on the parking lot and a power system interconnection unit that is installed on the parking lot. The power system interconnection system 100 can be provided as equipment for a business continuity plan (BCP). The power system interconnection unit includes a storage battery board 10 containing a storage battery (not illustrated), a power conversion board 20 containing a storage battery PCS (not illustrated), and an interconnection board 30 containing an interconnection control device (not illustrated) that performs power system interconnection with an electric power system. It is noted that the number of charge and discharge stations is not limited to four. The interconnection control device can perform a power system interconnection between the electric power system and at least one of the storage battery PCS, the charge and discharge station and an inverter device.

The electric-powered automobile includes a plug-in hybrid electric vehicle (PHEV) or an electric vehicle (EV) and is also referred to as PHEV or EV in the specification. Each of the charge and discharge stations 41-44 can charge and discharge a battery (on-vehicle storage battery) mounted on the electric-powered automobile. An inverter device 520 can make conversion from direct current to alternating current, and converts direct current from the solar battery 510 to alternating current and outputs the converted current. In other words, the inverter device 520 can discharge the energy from the solar battery 510. The storage battery PCS (also referred to as an AC-DC power conversion device) contained in the power conversion board 20 can bidirectionally convert power from alternating current to direct current and from direct current to alternating current, and can charge and discharge the storage battery (also referred to as a stationary storage battery) contained in the storage battery board 10. The interconnection control device contained in the interconnection board 30 performs power system interconnection operation between the electric power system and the storage battery PCS, the charge and discharge stations 41-44 as well as the inverter device 520 in the case where the electric power system is in a normal situation, and performs autonomous operation by the storage battery PCS and the charge and discharge stations 41-44 and the inverter device 520 in the case where the electric power system is in an abnormal situation (at the time of a disaster).

The charge and discharge stations 41-44 and the inverter device, and the storage battery board 10, the power conversion hoard 20 and the interconnection board 30 (power system interconnection unit) are installed on the parking lot. If required power cannot be supplied from the charge and discharge stations 41-44 to a predetermined load (also referred to as an important load or a first load) since all or part of the electric-powered automobiles are moving and are thus not in the parking lot at the time of a disaster, or if less power can be supplied from the inverter device 520, more specifically even if required power cannot be supplied to the important load from the charge and discharge stations 41-44 and the inverter device 520, the power in the storage battery can be supplied to the load by the storage battery PCS, and thus required power can be supplied to the load as a whole.

Figure 12:
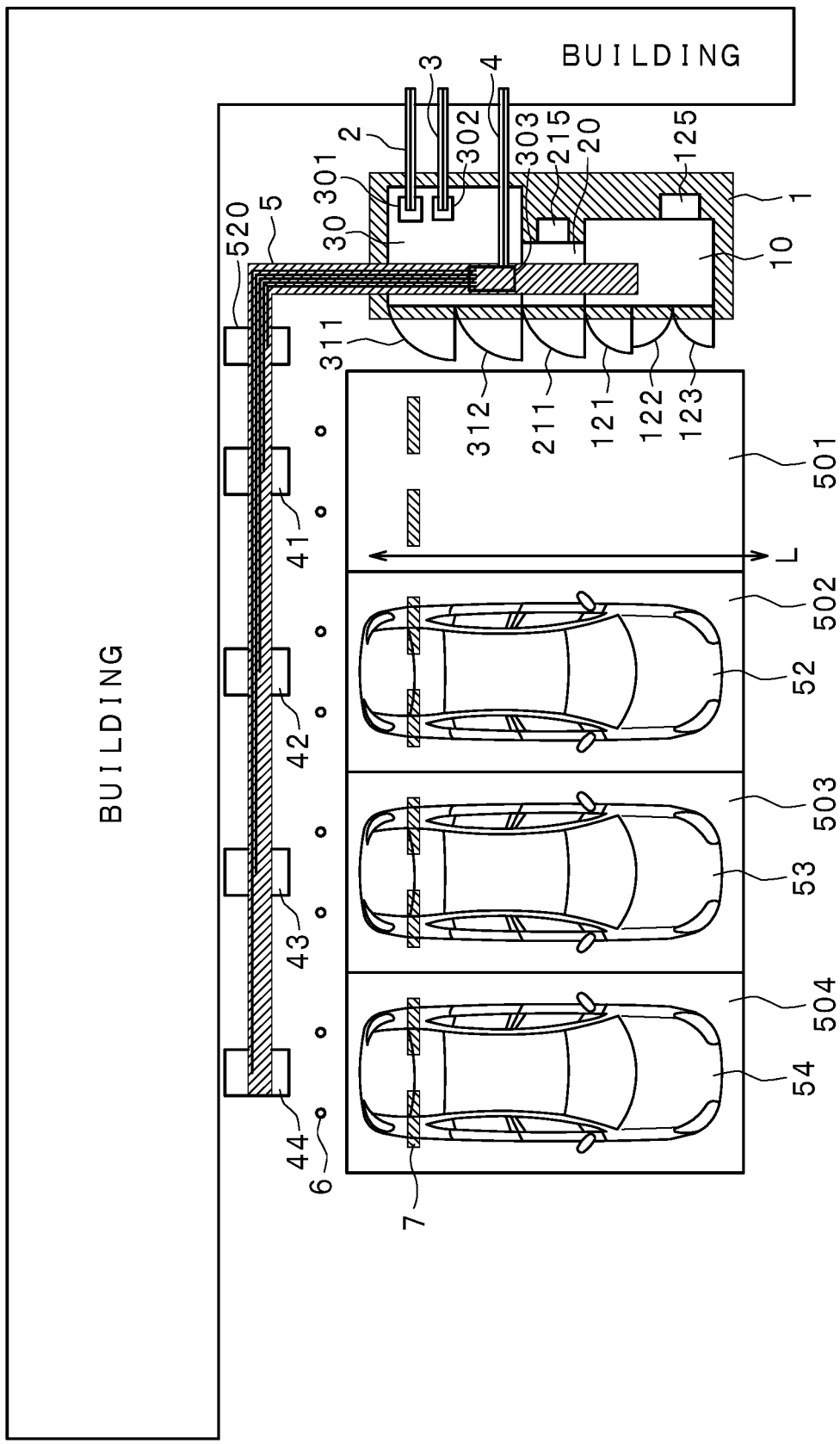
FIG. 12 is a plan view of one example of installation of the power system interconnection system according to the present embodiment.
Figure 13:
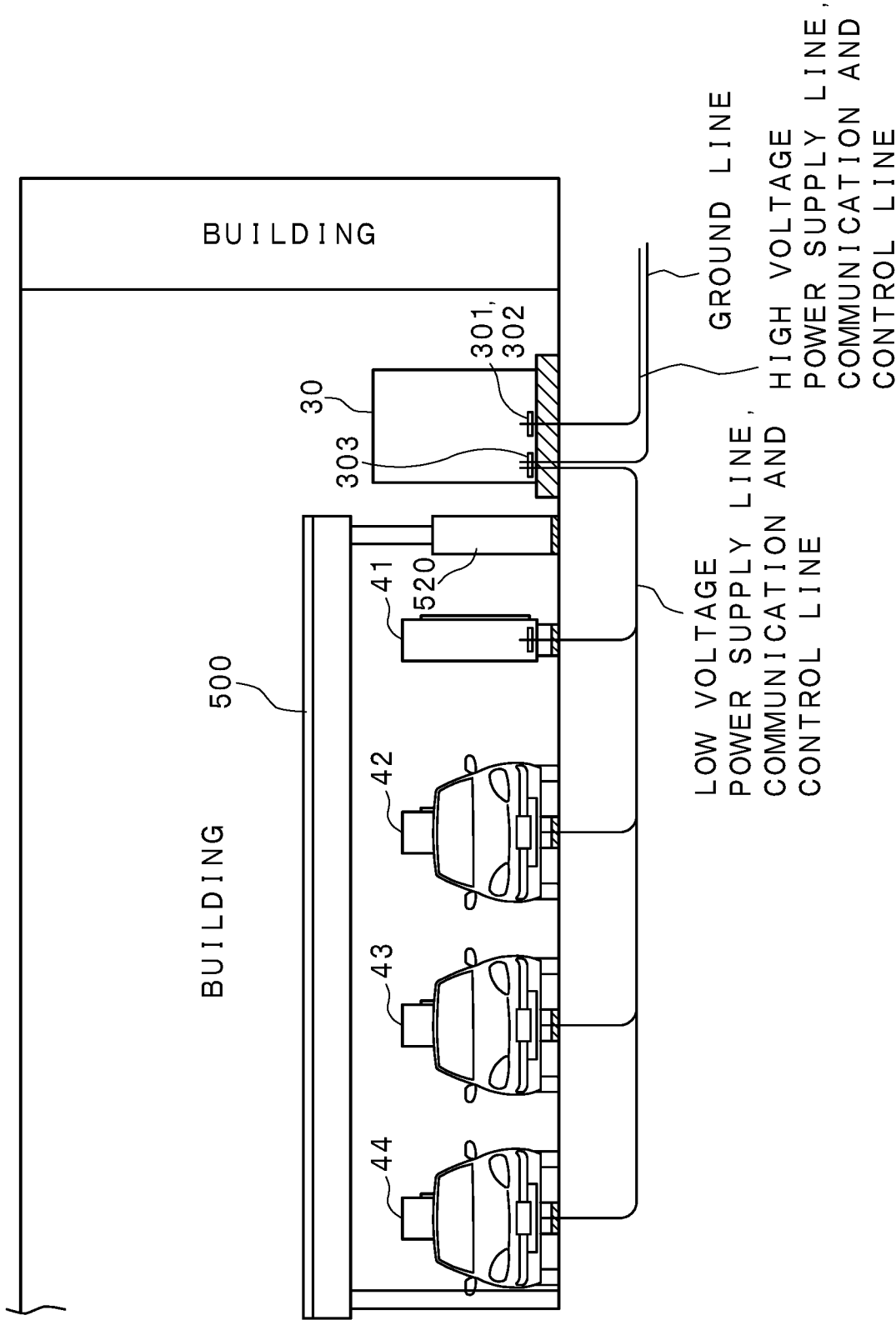
FIG. 13 is an elevation view illustrating one example of installation of the power system interconnection system according to the present embodiment.

FIG. 12 is a plan view of one example of installation of the power system interconnection system 100 according to the present embodiment while FIG. 13 is an elevation view illustrating one example of installation of the power system interconnection system 100 according to the present embodiment. In the example of the drawing, an electric-powered automobile to be parked at the parking space 501 out of the four parking spaces 501-504 is assumed to be absent. The reference code 6 represents a collision prevention pole while the reference code 7 represents a wheel stopper.

As illustrated in FIG. 12, the storage battery board 10, the power conversion board 20 and the interconnection board 30 are arranged so as to be aligned along the direction of the length of a vehicle (the direction denoted by the reference code L in the drawing). That is, the storage battery board 10, the power conversion board 20 and the interconnection board 30 can be installed so as to be aligned in the direction of a vehicle length of the parking space. The storage battery board 10, the power conversion board 20, and the interconnection board 30 are arranged so as to be aligned in the direction of the vehicle length of the parking space arranged in parallel for each electric-powered automobile in the parking lot, whereby the power system interconnection unit (the storage battery board 10, the power conversion board 20 and the interconnection board 30) can be arranged in a parking space having a size of approximately one electric-powered automobile, for example, which can reduce the ground area required for the parking lot inclusive of the power system interconnection unit. Moreover, the distance between the power system interconnection unit and the charge and discharge stations 41-44 can be shortened, which can facilitate wiring work and burying work of a power line and a communication and control line to be described later and reduce the cost of such works.

The storage battery board 10 has openable doors 121, 122 and 123 at the front surface on the same side as the parking space. The power conversion board 20 has an openable door 211 at the front surface on the same side as the parking space. The interconnection board 30 has openable doors 311 and 312 at the front surface on the same side as the parking space. That is, the storage battery board 10, the power conversion board 20 and the interconnection board. 30 can be installed such that the respective openable doors provided on the storage battery board 10, the power conversion board 20 and the interconnection board 30 face toward the parking space. A worker can open each of the openable doors for working when performing maintenance and checkups on the storage battery board 10, the power conversion board 20 and the interconnection hoard 30.

As illustrated in FIG. 12, for example, the electric-powered automobile parked in the parking space 501 adjacent to the respective operable doors of the storage battery board 10, the power conversion board 20 and the interconnection board 30 is moved from the parking space 501 to make this parking space 501 available, which allows this parking space 501 to be utilized for a working space to perform maintenance and checkup on the power system interconnection unit. This can eliminate the need for installing the power system interconnection unit while the work space for maintenance and checkup is previously ensured, and reduce the area taken up by the power system interconnection unit inclusive of the work space.

The storage battery board 10 is provided with an air intake and exhaust opening 125 at the rear surface on the side opposite to the parking space. The power conversion board 20 is provided with an air intake and exhaust opening 215 at the rear surface on the side opposite to the parking space. The storage battery board 10 contains a cooling device and a heater (not illustrated) for managing the temperature of the storage battery other than the storage battery. The power conversion board 20 contains a cooling device (not illustrated) for heat dissipation of the storage battery PCS other than the storage battery PCS. The provision of the air intake and exhaust openings at the rear surface on the side opposite to the parking space can prevent hot air from being blown to the user at the parking space and can avoid making the user feel uncomfortable.

Each of the storage battery board 10, the power conversion board 20 and the interconnection board 30 can have a plate thickness of 2.3 mm or more. Generally, for cubicle type high voltage receiving equipment (hereinafter also simply referred to as a cubicle), a metal plate being approximately 1.6 mm in thickness is used. In this case, under a fire prevention ordinance, the cubicle needs to be installed 3 m or more away from the building. Setting the plate thickness to 2.3 mm or more eliminates the restriction on the clearance from the building of 3 m or more. This allows the power system interconnection unit to be installed without taking into account the restriction on the clearance from a building even in the parking lot adjacent to buildings, which enables greater freedom of installation of the power system interconnection unit, resulting in easy installation.

As illustrated in FIG. 12, the interconnection board 30 has a high voltage cable inlet 301 and a high voltage cable outlet 302 near the rear surface on the bottom plate and a low voltage cable outlet 303 near the front surface on the bottom plate. Into the high voltage cable inlet 301, a power line (high voltage power supply line) extending from a commercial power supply side of the electric power system and a communication and control line that are wired through conduit tubes (for example, hard polyethylene tubes having plasticity) buried in the ground are led by a suitable length. Into the high voltage cable outlet 302, a power line (high voltage power supply line) extending from a load side and a communication and control line that are wired through conduit tubes buried in the ground are led by a suitable length. Into the low voltage cable outlet 303, a ground line, power lines (low voltage power supply line) extending from the charge and discharge stations 41-45 and a communication and control line as well as a power line (low voltage power supply line) extending from the inverter device 520 and a communication and control line that are wired through conduit tubes buried in the ground are led by a suitable length.

One example of the conduit tubes buried in the ground is similar to that in FIG. 4 of Embodiments 1 and 2.

The power system interconnection system 100 according to the present embodiment can be installed as described below. That is, the storage battery board 10, the power conversion board 20 and the interconnection board 30 are installed so as to be aligned on a base 1 provided on the ground of the parking lot. Base bolts fixed to the base 1 are threaded through bolt holes formed on the bottom plate (not illustrated) of each of the storage battery board 10, the power conversion board 20 and the interconnection board 30 and fastened by nuts to thereby secure the storage battery board 10, the power conversion board 20 and the interconnection board 30 to the base 1.

The power system interconnection unit is divided into three installation boards such as the storage battery board 10, the power conversion board 20 and the interconnection board 30. This eliminates the need for a large transport vehicle when the storage battery board 10, the power conversion board 20 and the interconnection board 30 are carried in an installation site. This also eliminates the need for large heavy equipment when the storage battery board 10, the power conversion board 20 and the interconnection board 30 are lifted and moved to an installation site. Especially, in a shopping mall where an indefinite number of customers come and go, this can prevent the customers from having inconvenience and a bad impression when these boards are installed at a parking lot. In addition, this can achieve compact device installation by making effective use of the limited space of the parking lot.

Furthermore, a cable extending from the commercial power supply is connected through the high voltage cable inlet 301 of the interconnection board 30, a cable extending to a predetermined load is connected through the high voltage cable outlet 302 of the interconnection board 30, and cables extending from the charge and discharge stations 41-44 and the inverter device 520 are connected through the low voltage cable outlet 303 of the interconnection board 30. The cables include a power line and a communication and control line. The length of the low-voltage side wires and the length of the communication and control line are presumable from a package design of the power system interconnection unit, and thus the previously-processed wire can be prepared in advance.

The above-described configuration enables an installation work of the power system interconnection unit in a relatively short time and reduction in construction cost.

Furthermore, the multiple charge and discharge stations 41-44 can be installed so as to be aligned on the base 1 provided on the ground for the parking lot. The power system interconnection unit is installed adjacent to the parking space to thereby shorten the distance between the power system interconnection unit and the charge and discharge stations 41-44, which can facilitate wiring work and burying work of the power line and the communication line and reduce the cost of such works.

The arrangement example of the decorative wall 90 is similar to that in FIG. 5 of Embodiments 1 and 2.

In the example of FIG. 12, though the storage battery board 10, the power conversion board 20 and the interconnection board 30 are configured to be aligned in the position adjacent to the parking space 501 at an end of the four parking spaces 501-504, the installation is not limited to the example of FIG. 12. For example, the storage battery board 10, the power conversion board 20 and the interconnection board 30 may be aligned in a section having a size corresponding to approximately one vehicle of the parking space that has been provided between the parking spaces 502 and 503.

Figure 14:
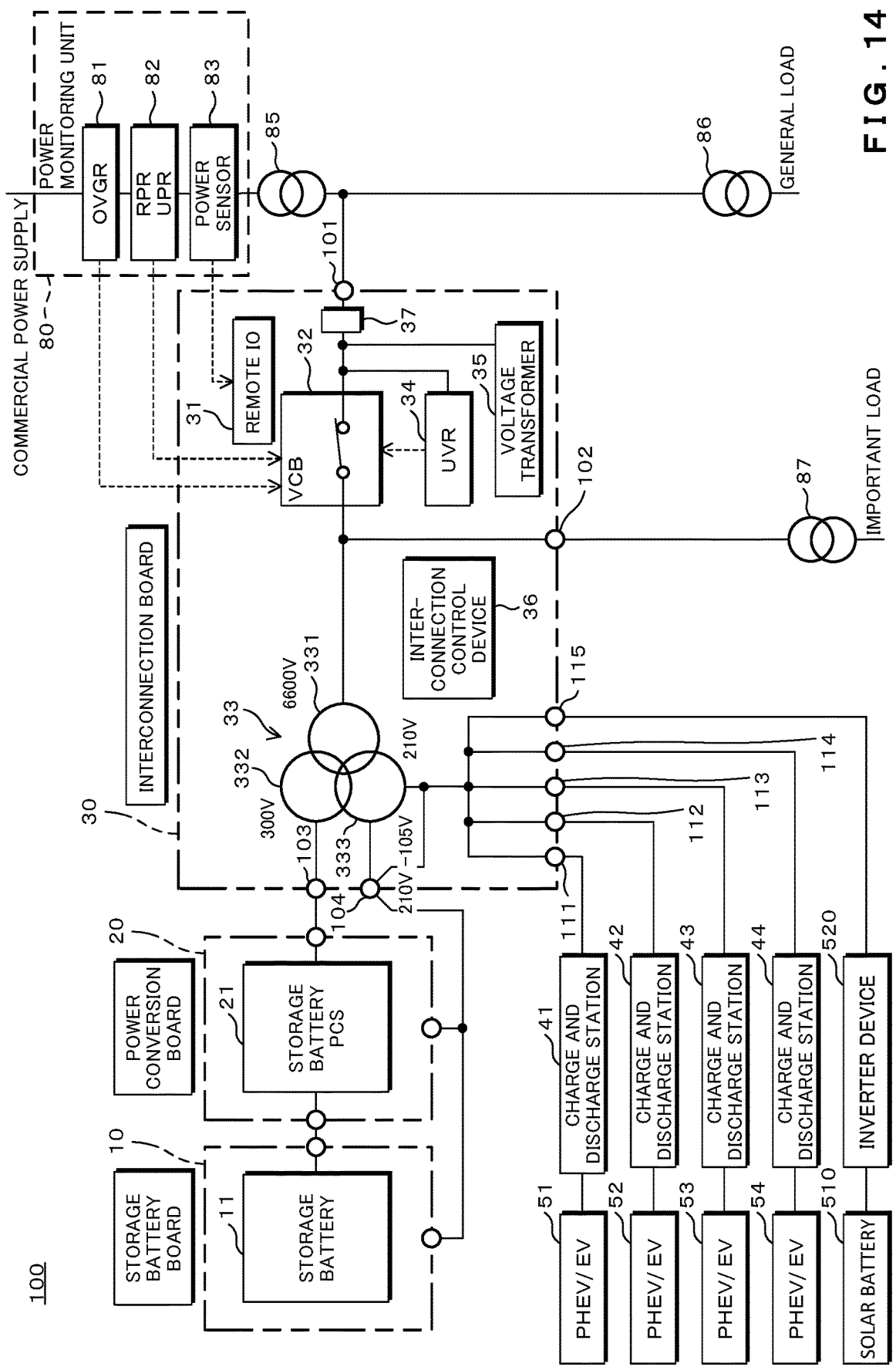
FIG. 14 is a schematic view illustrating one example of a circuit configuration of the power system interconnection system according to the present embodiment.

FIG. 14 is a schematic view illustrating one example of a circuit configuration of the power system interconnection system 100 according to the present embodiment. The storage battery board 10 contains a storage battery (stationary storage battery) 11 as well as a control device, a cooling device, a heater and the like that are not illustrated. The power conversion board 20 contains the storage battery PCS 21 as well as a control device, a cooling device and the like that are not illustrated. The interconnection board 30 includes a remote IQ 31, a VCB 32 functioning as a switch unit, a transformer 33, a UVR 34, a voltage transformer 35, etc. other than the interconnection control device 36.

The interconnection board 30 includes terminal blocks 101 and 102 and breakers 103, 104 and 111-115. The terminal block 101 is provided at a current path on the high voltage cable inlet side (high voltage power supply line). That is, the terminal block 101 is connected to a power line extending from the secondary side of a step-down transformer 85 of the electric power system and a power line extending from the primary side of a step-down transformer 86 connected to a general load (second load). The general load here includes electric equipment that is relatively less affected even if power is shut off at the time of a disaster, for example.

The terminal block 102 is provided at a current path on the high voltage cable outlet side (high voltage power supply line). That is, the terminal block 102 is connected to a power line extending from the primary side of a step-down transformer 87 connected to an important load (first load). The important load here is an important load that needs to be continuously supplied with power even at the time of a disaster and includes, for example, an emergency elevator, electric equipment needing continuous operation, lighting and air-conditioning equipment in a building, etc.

The terminal block 101 is connected to one of the electrodes in the VCB 32, the UVR 34 and the voltage transformer 35 via a disconnecting switch 37. The voltage transformer 35 will be described later. The VCB 32 is a vacuum circuit breaker, and is a circuit breaker having electrodes in a high-vacuum container that diffuses in high vacuum the material made of arcing developed between the electrodes when current is interrupted, and dissipates the arcing.

The UVR 34 is an undervoltage relay and can detect abnormality such as short circuits, power failure or the like on the electric power system side. If detecting an abnormality, the UVR 34 outputs a control signal to the VCB 32 to thereby shut off the current path of the VCB 32.

Furthermore, for a building on which management of electric power demand is performed using the power system interconnection system, a power monitoring unit 80 for monitoring power on the primary side of the step-down transformer 85 is provided. Note that the power monitoring unit 80 is not necessarily provided. If the step-down transformer 85 is not provided, a site to be monitored by the power monitoring unit 80 is appropriately set. The power monitoring unit 80 includes an OVGR 81, an RPR/UPR 82 and a power sensor 83. The OVGR, 81 is a ground overvoltage relay and continuously detects a ground fault of the electric power system. The RPR/TPR 82 is a reverse power relay and an underpower relay and can detect an abnormality such as reverse power flow to the electric power system side, short circuits or the like. In the case where an abnormality is detected by the OVGR 81 or the RPR/UPR 82 as well, the current path of the VCB 32 is shut off.

The remote IO 31 is an AD converter for converting power (analog value) detected by the power sensor 83 to a digital value and outputs the converted power (digital value) to the interconnection control device 36.

The other electrode of the VCB 32 is connected to the transformer 33 (more specifically, a first winding 331) through a current path. The transformer 33 includes the first winding 331, a second winding 332 connected to the breaker 103 through a current path and a third winding 333 connected to the breakers 111-115 through current paths.

In other words, the transformer 33 can be a three-phase transformer with three windings. The voltage and the power (apparent power) on the first winding 331 side can be assumed as 6600 V and 50 kVA, respectively; for example, the voltage and the power on the second winding 332 side can be assumed as 300 V and 50 kVA, respectively, for example, and the voltage and the power on the third winding 333 side can be assumed as 210 V and 50 kVA, respectively for example. The voltage and power are not limited to these values. The employment of the transformer with three-windings as the transformer 33 may save space and reduce weight in comparison with provision of two transformers.

The breaker 103 is connected to the storage battery PCS 21. The storage battery PCS 21 can bidirectionally convert power from alternating current to direct current and from direct current to alternating current, and can charge and discharge the storage battery 11.

The breaker 104 is connected to a current path for one of the three phases of the third winding 333. For example, voltage of 105 V-210 V is supplied as a power source for the control device and the cooling device in the power conversion board 20 and supplied as a power source for the control device, the cooling device and the heater in the storage battery board 10.

The breakers 111-114 are connected to the power lines extending from the charge and discharge stations 41-44, respectively. The charge and discharge stations 41-44 are provided with respective conversion circuits capable of bidirectionally converting power from alternating current to direct current and from direct current to alternating current, and can charge and discharge the respective batteries mounted on the electric-powered automobiles 51-54. The breaker 115 is connected to the power line extending from the inverter device 520. The inverter device 520 is provided with a conversion circuit capable of converting power from direct current to alternating current and thus can convert the energy of the solar battery 510 into alternating current (can discharge the solar battery 510).

The charge and discharge stations 41-44 are provided with respective report units (not illustrated) that report information on charge or discharge of the batteries of the electric-powered automobiles 51-54. Each of the report units may be a display panel or an indicator light or may report the information to a terminal device used by the user or the manager via a wireless communication, for example. The information on the charge or discharge may include, for example, the state of operation such as during preparation for charge or discharge, preparation completed, during charging and discharging, charging and discharging completed, etc., the state of charge (SOC) of a battery; a time required for full charge, a remaining time until full charge, a dischargeable amount, a fee for charge and discharge, etc. Moreover, the inverter device 520 is provided with a report unit (not illustrated) that reports information on discharge of the solar battery 510. The report unit may be a display panel or an indicator light or may report the information to a terminal device used by the user or the manager via a wireless communication, for example. The information on the discharge of the solar battery 510 may include, for example, the state of operation such as during standby, during discharge, low output operation, etc. and the operating voltage and output power of the solar battery etc. This can timely provide the user with the information on the charge and discharge of the electric-powered automobile and the information on the discharge of the solar battery.

The power system interconnection method according to the power system interconnection system 100 of the present embodiment will be described.

Figure 15:
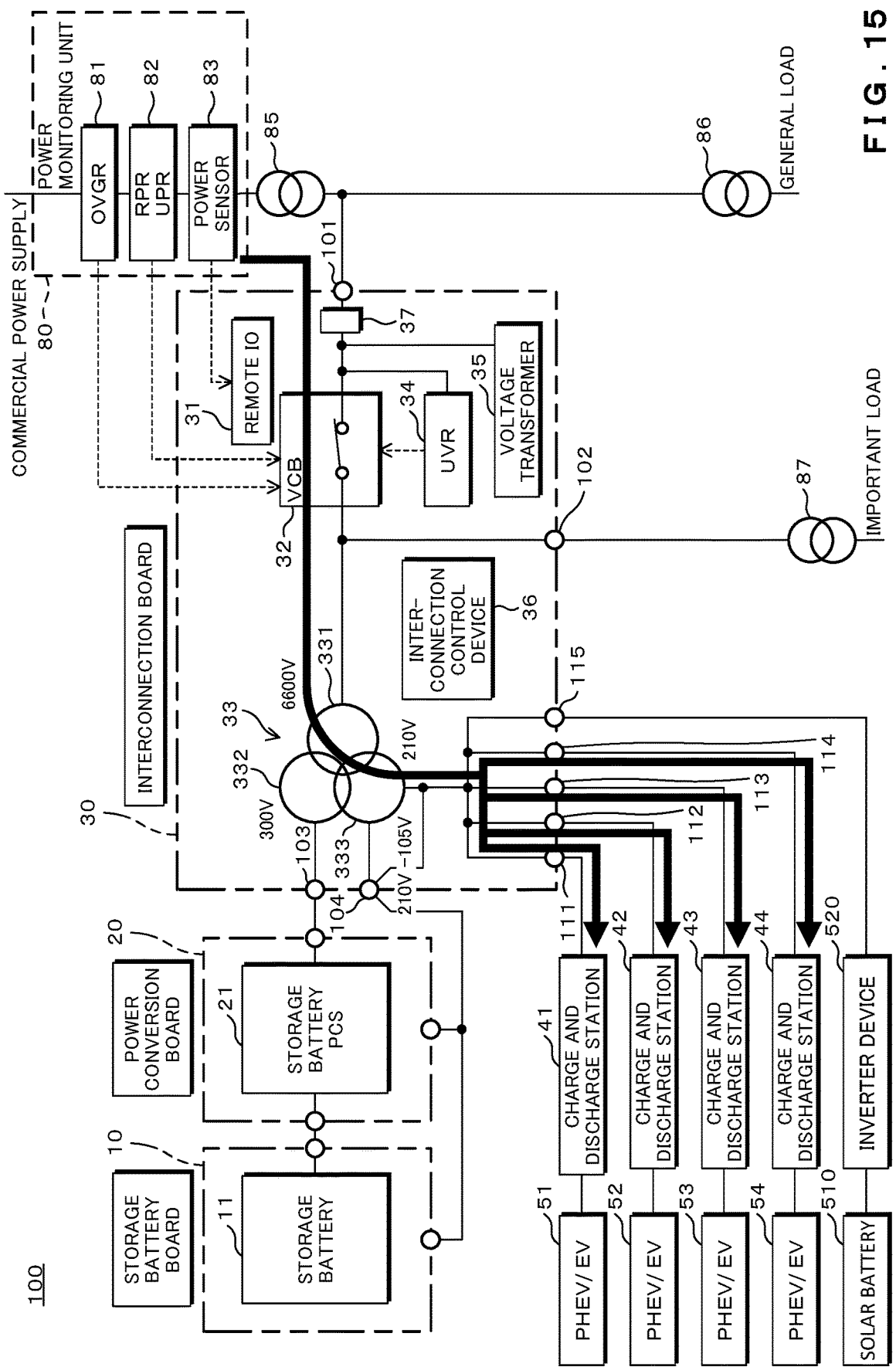
FIG. 15 is a schematic view illustrating a first example of the power system interconnection in the case where an electric power system by the power system interconnection system according to the present embodiment is in the normal situation.

FIG. 15 is a schematic view illustrating a first example of the power system interconnection in the case where an electric power system by the power system interconnection system 100 according to the present embodiment is in the normal situation. The interconnection control device 36 can charge the electric-powered automobiles 51-54 by the charge and discharge stations 41-44, respectively, in the case where the electric power system is in the normal situation and where a charge mode is set. This makes it possible to utilize the power system interconnection system 100 as fast charging stations for the electric-powered automobiles. It is noted that the inverter device 520 can output power in correspondence with an amount of solar radiation at that time to the extent that a reverse power flow to the electric power system side does not occur and can supply part of the charging energy to the electric-powered automobiles, for example.

Though not illustrated, power is supplied from the commercial power supply to the important load in the case where the electric power system is in the normal situation while power is supplied from the commercial power supply to the general load in the case where the electric power system is in the normal situation.

The load is separated into two systems of the general load and the important load to thereby make the power supplied at the time of a disaster to be described later to a minimum required amount, which enables continuous power supply to the important load and extension of the time capable of supplying power to the important load.

Figure 16:
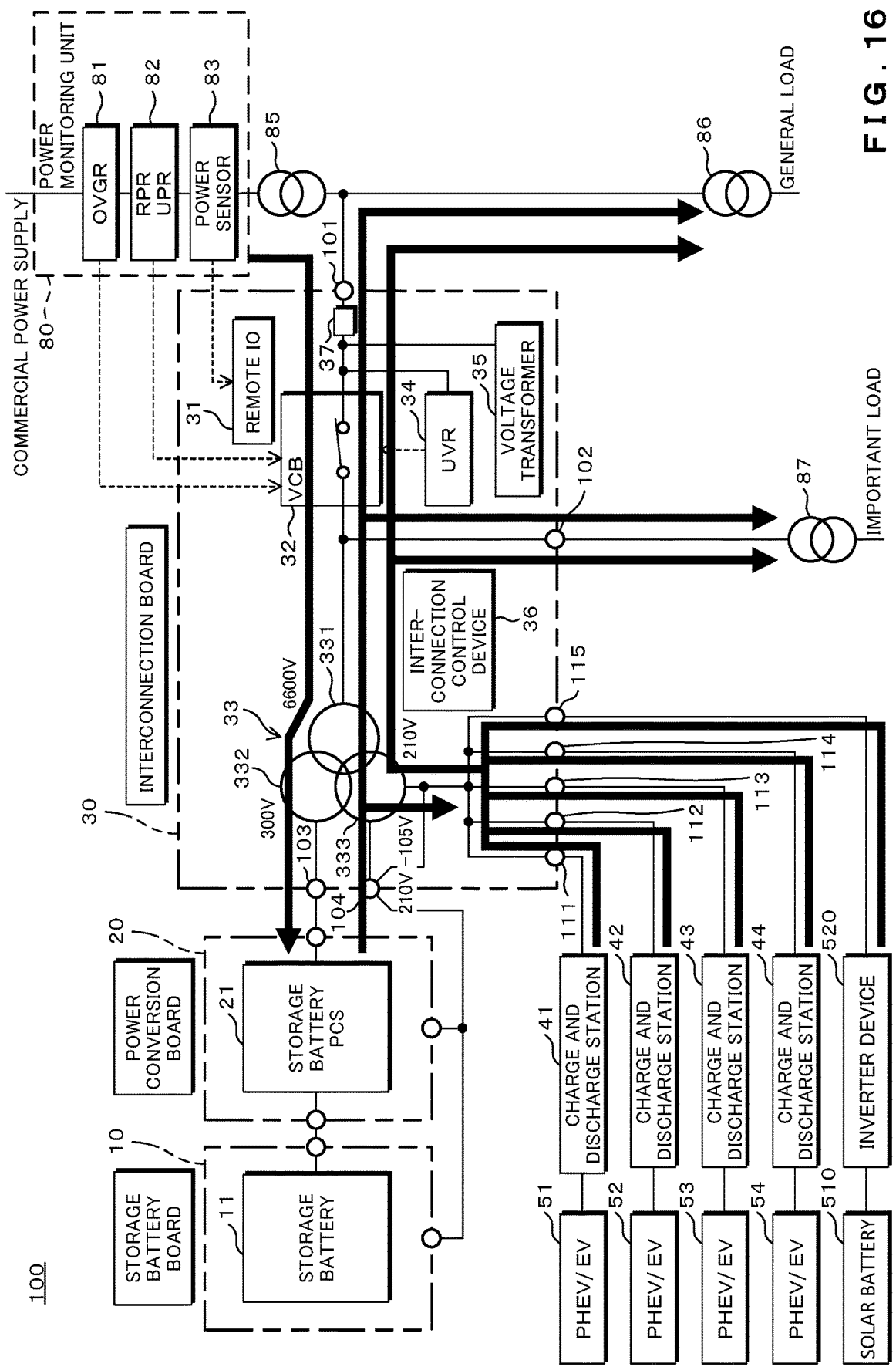
FIG. 16 is a schematic view illustrating a second example of the power system interconnection in the case where an electric power system by the power system interconnection system according to the present embodiment is in the normal situation.

FIG. 16 is a schematic view illustrating a second example of the power system interconnection in the case where the electric power system performed by the power system interconnection system 100 according to the present embodiment is in the normal situation. In the state where the electric power system is in the normal situation and where an energy management mode (also abbreviated as an enemane mode) is set, if the power-receiving point power measured at a predetermined site is equal to or more than a threshold, that is, if the power detected by the power sensor 83 is equal to or more than a threshold, the interconnection control device 36 supplies the important load and the general load with power from the charge and discharge stations 41-44 and the inverter device 520 and the important load and the general load with power from the storage battery PCS 21 such that the power detected by the power sensor 83 is equal to or less than the threshold. This enables peak-cut operation of power. Note that in the case where the power-receiving point power measured at a predetermined site is equal to or less than the threshold, power, which is less than a threshold, can be supplied from the electric power system to the charge and discharge stations 41-44 or the storage battery PCS 21.

Figure 17:
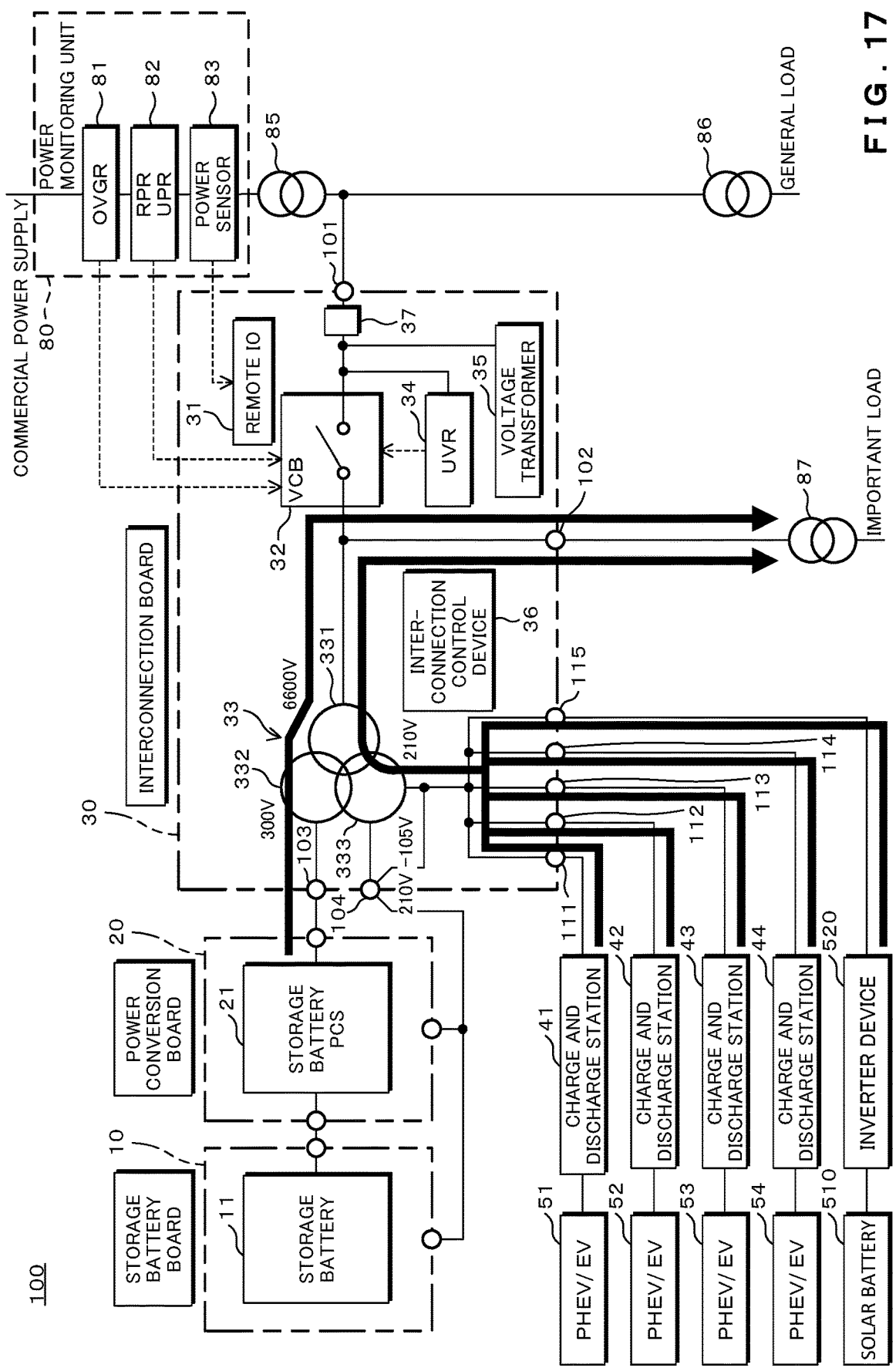
FIG. 17 is a schematic view illustrating one example of autonomous operation in the case where the electric power system by the power system interconnection system according to the present embodiment is in the emergency situation.

FIG. 17 is a schematic view illustrating one example of autonomous operation in the case where the electric power system by the power system interconnection system 100 according to the present embodiment is in an emergency situation. The interconnection control device 36 disconnects the commercial power supply from the important load by opening the electrodes in the VCB 32 when the electric power system is in the emergency situation. Power is supplied from the charge and discharge stations 41-44 as well as the inverter device and the storage battery PCS 21 in this state, whereby the autonomous operation by the interconnection control device 36 is made possible.

The interconnection control device 36 can supply the important load with power from at least one of the charge and discharge stations 41-44 as well as the inverter device 520 and the storage battery PCS 21 when the electric power system is in the emergency situation.

In the case where the interconnection control device 36 performs the autonomous operation, the storage battery PCS 21 performs voltage control and operates as a voltage source. Current needed to obtain required power is achieved by the charge and discharge stations 41-44 and the inverter device 520 operating as a current source while being connected to the storage battery PCS 21 operating as the voltage source.

According to the above-mentioned configuration, even if required power cannot be supplied from the charge and discharge stations 41-44 and the inverter device 520 to the important load since some of the electric-powered automobiles are moving at the time of a disaster, power can be supplied from the storage battery PCS 21 to the important load, and thus required power can be supplied to the important load of the electric power system as a whole.

More specifically, in the case where the electric power system is in the emergency situation, if power that the charge and discharge stations 41-44 and the inverter device 520 are able to supply is more than the capacity of the important load, the interconnection control device 36 supplies the storage battery PCS 21 with the excess of the power from the charge and discharge stations 41-44 and the inverter device 520, This makes it possible to make effective use of the power of the electric-powered automobiles if the electric-powered automobiles are parked in the parking space and are not moving.

Alternatively, in the case where the electric power system is in the emergency situation, if power that the charge and discharge stations 41-44 and the inverter device 520 are able to supply is less than the capacity of the important load, the interconnection control device 36 supplies the important load with power from the charge and discharge stations 41-44, the inverter device 520 and the storage battery PCS 21. For example, assuming that the capacity of the important load is 50 kVA, in the case where power of 30 kVA can be supplied from the charge and discharge stations 41-44 and the inverter device 520 in total, power of 20 kVA is supplied from the storage battery PCS 21 to thereby supply power of 50 kVA from the high-voltage side of the transformer 33 to the important load. If the capacity of the important load is varied, power suitable for the capacity of the important load can be supplied. This makes it possible to supply the deficient amount of power from the storage battery PCS 21 if all or part of the required electric-powered automobiles are moving and are thus not m the parking space, resulting in supply of required power to the important load of the electric power system.

Figure 18:
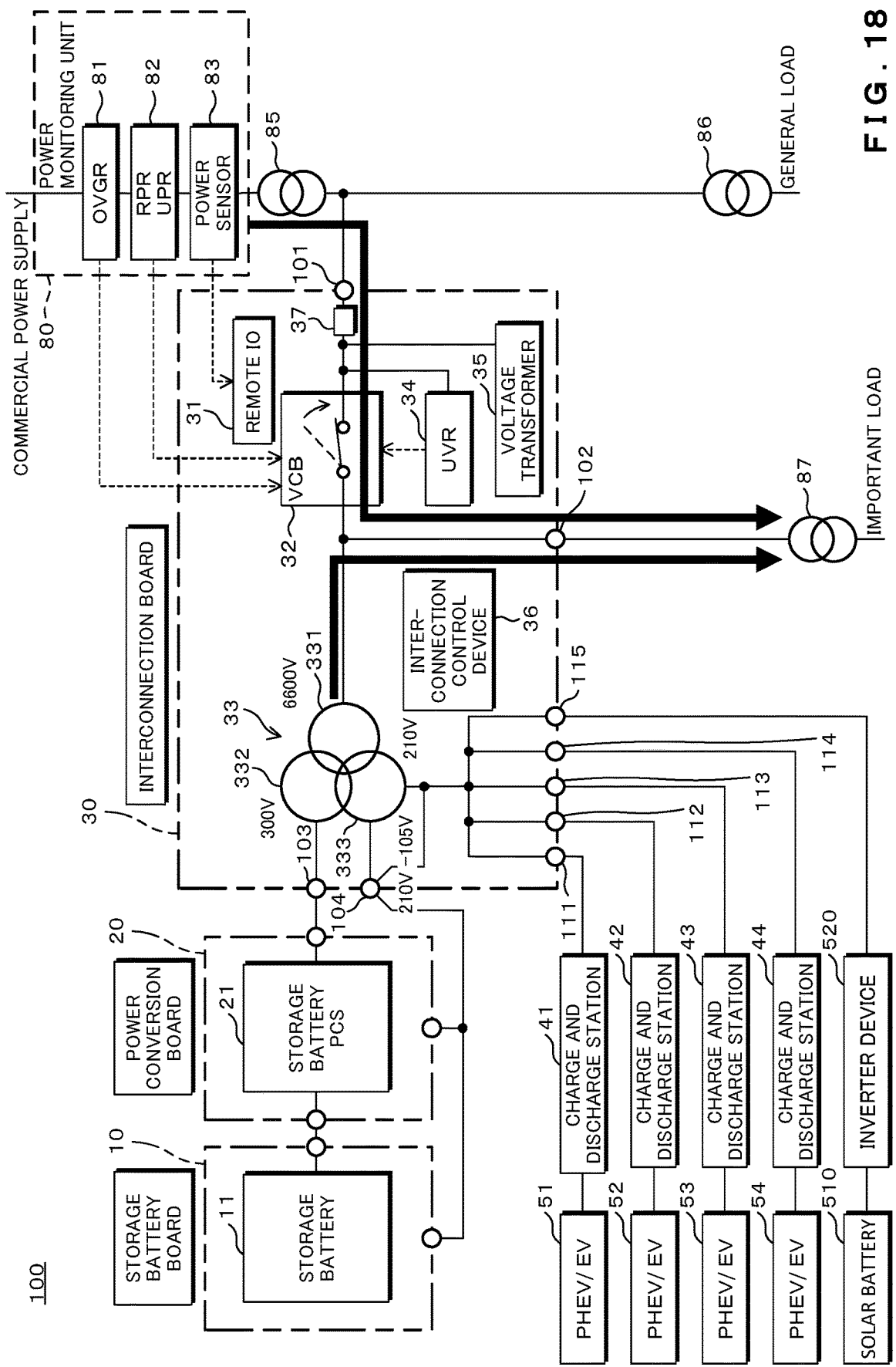
FIG. 18 is a schematic view illustrating one example of operation switching in the case where the electric power system by the power system interconnection system according to the present embodiment is restored from the emergency situation to the normal situation.

FIG. 18 is a schematic view illustrating one example of operation switching in the case where the electric power system by the power system interconnection system 100 according to the present embodiment is restored from the emergency situation to the normal situation. The interconnection control device 36 makes an uninterruptible switching from power supplied from at least one of the charge and discharge stations 41-44 as well as the inverter device 520 and the storage battery PCS 21 to the important load to the power supplied from the commercial power source if the electric power system is restored. The uninterruptible switching can supply the important load with power from the commercial power supply by for example, detecting the phase of the commercial power supply by the voltage transformer 35, and closing the electrodes in the VCP 32 at the timing when the phase of the storage battery PCS is synchronized with the phase of the commercial power supply.

After the commercial power supply is uninterruptibly reconnected to the important load, the interconnection control device 36 stops the operation of the charge and discharge stations 41-44, the inverter device 520 and the storage battery PCS 21, and ends the auto autonomous operation. The storage battery PCS 21 performs voltage control, which enables the uninterruptible switching. Then, the interconnection control device 36 can restart the charge and discharge stations 41-44, the inverter device 520 and the storage battery PCS 21 in order to perform power system interconnection. The uninterruptible switching by synchronizing the phases allows for stable power supply to the important load.

In the above-described embodiment, though the inverter device 520 and the solar battery 510 are configured to be added on the low-voltage (210 V, for example) side, the configuration is not limited thereto. For example, the inverter device and the solar battery may be added on the high-voltage side. The configuration in which the inverter device and the solar battery are added on the high-voltage side will be described below.

Figure 19:
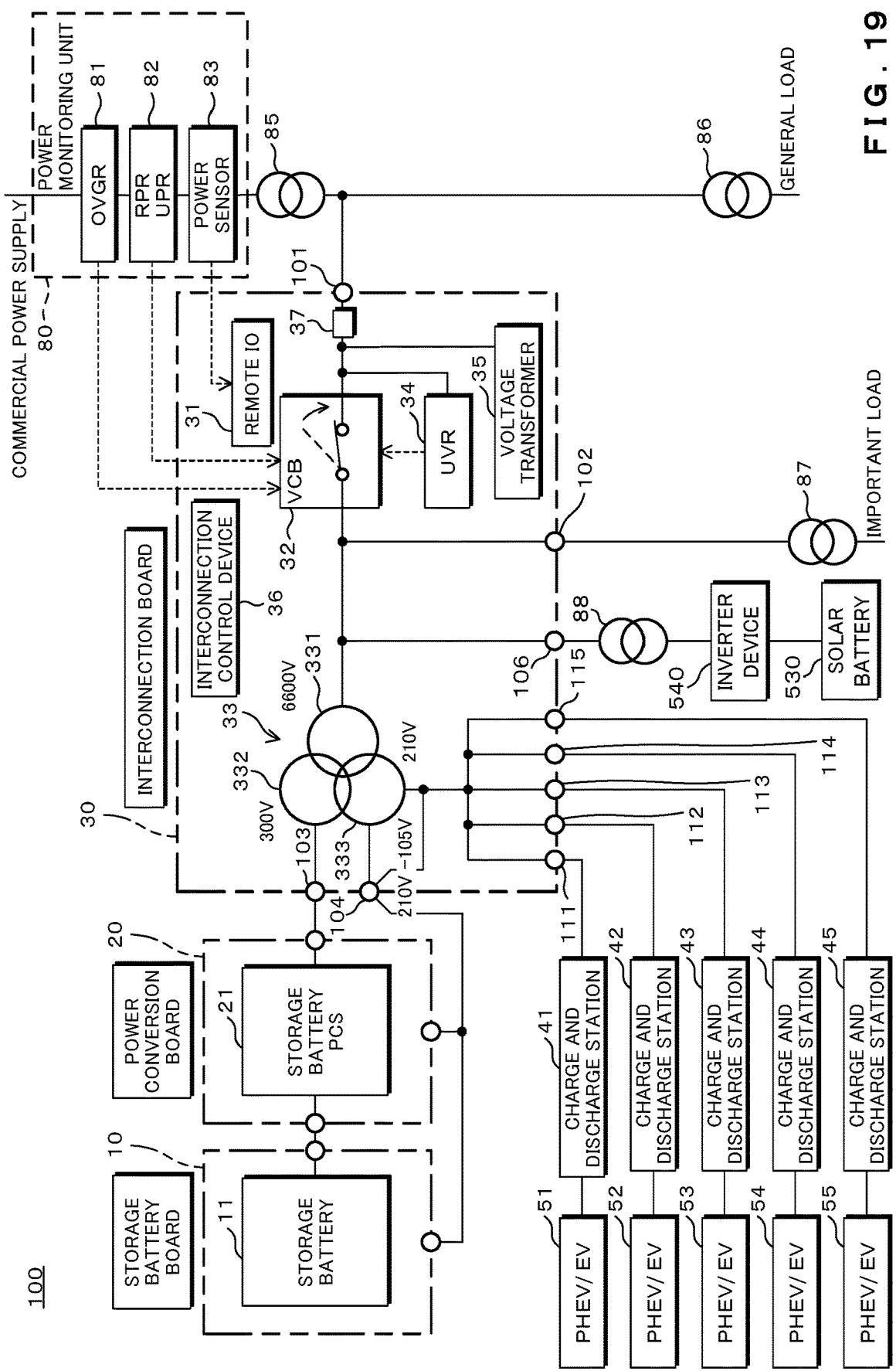
FIG. 19 is a schematic view illustrating one example of the circuit configuration of the power system interconnection system in the case where an inverter device and a solar battery are added at a high-voltage side.

FIG. 19 is a schematic view illustrating one example of a circuit configuration of the power system interconnection system 100 in the case where an inverter device and a solar battery are added at a high-voltage side. The difference from the configuration illustrated in FIG. 11 in which the inverter device 520 and the solar battery 510 are added at a low-voltage side is that the inverter device 520 is replaced with a charge and discharge station 45 and the solar battery 51 is replaced with a PHEV/EV 55. The current path between the VCV 32 and the transformer 33 is connected to the terminal block 106. The terminal block 106 is connected to a transformer 88, an inverter device 540 and a solar battery 530 in this order. The terminal block 106 is similar to the terminal block 102. The inverter device 540 can output, for example, power of 50 kVA and alternating current of 210 V to the transformer 88. The transformer 88 can step up the voltage output by the inverter device 540 to 6600 V, for example. It is noted that the voltage output by the inverter device 540 is not limited to 210 V.

Figure 20:
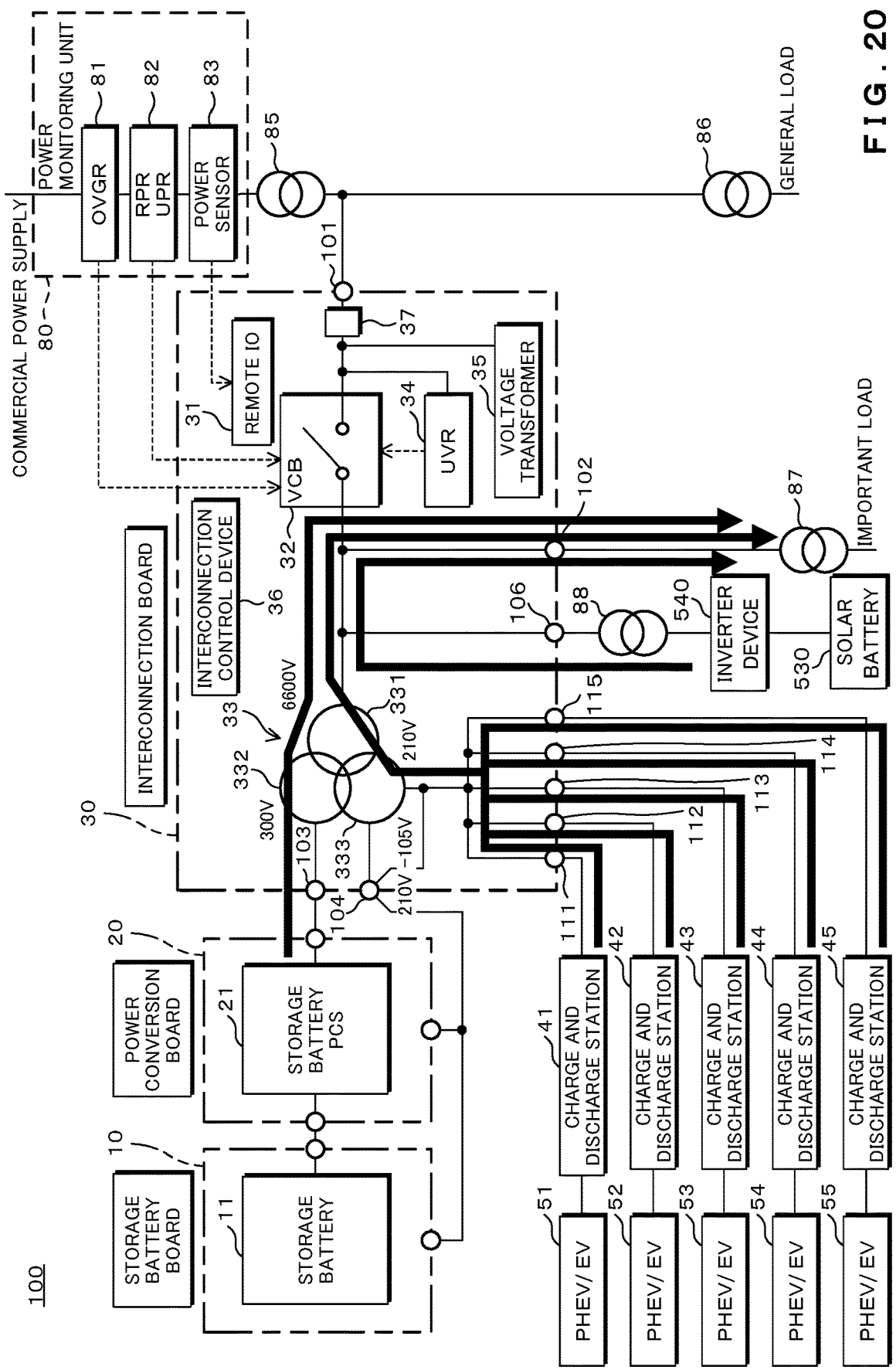
FIG. 20 is a schematic view illustrating one example of autonomous operation in the case where the electric power system by the power system interconnection system is in the emergency situation and where the inverter device and the solar battery are added at a high-voltage side.

FIG. 20 is a schematic view illustrating one example of autonomous operation in the case where the electric power system by the power system interconnection system 100 is in the emergency situation when the inverter device and the solar battery are added at a high-voltage side. The interconnection control device 36 disconnects the commercial power supply from the important load by opening the electrodes in the VCB 32 in the case where the electric power system is in the emergency situation. Power is supplied from the inverter device 540, the charge and discharge stations 41-45 or the storage battery PCS 21 in this state, whereby the autonomous operation by the interconnection control device 36 is made possible.

The interconnection control device 36 can supply power from at least one of the inverter device 540 as well as the charge and discharge stations 41-45 and the storage battery PCS 21 to the important load when the electric power system is in the emergency situation.

In the case where the interconnection control device 36 performs the autonomous operation, the storage battery PCS 21 performs voltage control and operates as a voltage source. Power from the inverter device 540 is supplied to the important load with top priority, and thus the inverter device 540 is operated with top priority. Assuming that power needed by the important load cannot be supplied from the inverter device 540, power from the charge and discharge stations 41-45 is supplied. Assuming that power needed by the important load cannot be supplied from the inverter device 540 and the charge and discharge stations 41-45, power is supplied from the storage battery PCS 21. Thus, even if the power supply from the solar battery 530 is deficient, the deficient amount can be supplied from the charge and discharge stations 41-45 or the storage battery PCS 21, resulting in supply of required amount of power to the load.

If excess amount of power is output from the inverter device 540, that is, if more power than what is needed by the important load can be supplied from the inverter device 540, the PHEV/EVs 51-55 can be charged by the inverter device 540 via the charge and discharge stations 41-45, or the storage battery 11 can be charged by the inverter device 540 via the storage battery PCS 21. This makes it possible to make effective use of the power produced by the solar battery 530. If the output of the inverter device 540 is excessive even after charging of the PHEV/EVs 51-55 and the storage battery 11, the inverter device 540 can be operated in a reduced manner.

In the above-described embodiment, though the power system interconnection of the electric power system is configured to be made at a high voltage of 6600 V the voltage is not limited thereto. The power system interconnection may be performed at a low voltage. The following describes the case where the power system interconnection is performed at a low voltage.

Figure 21:
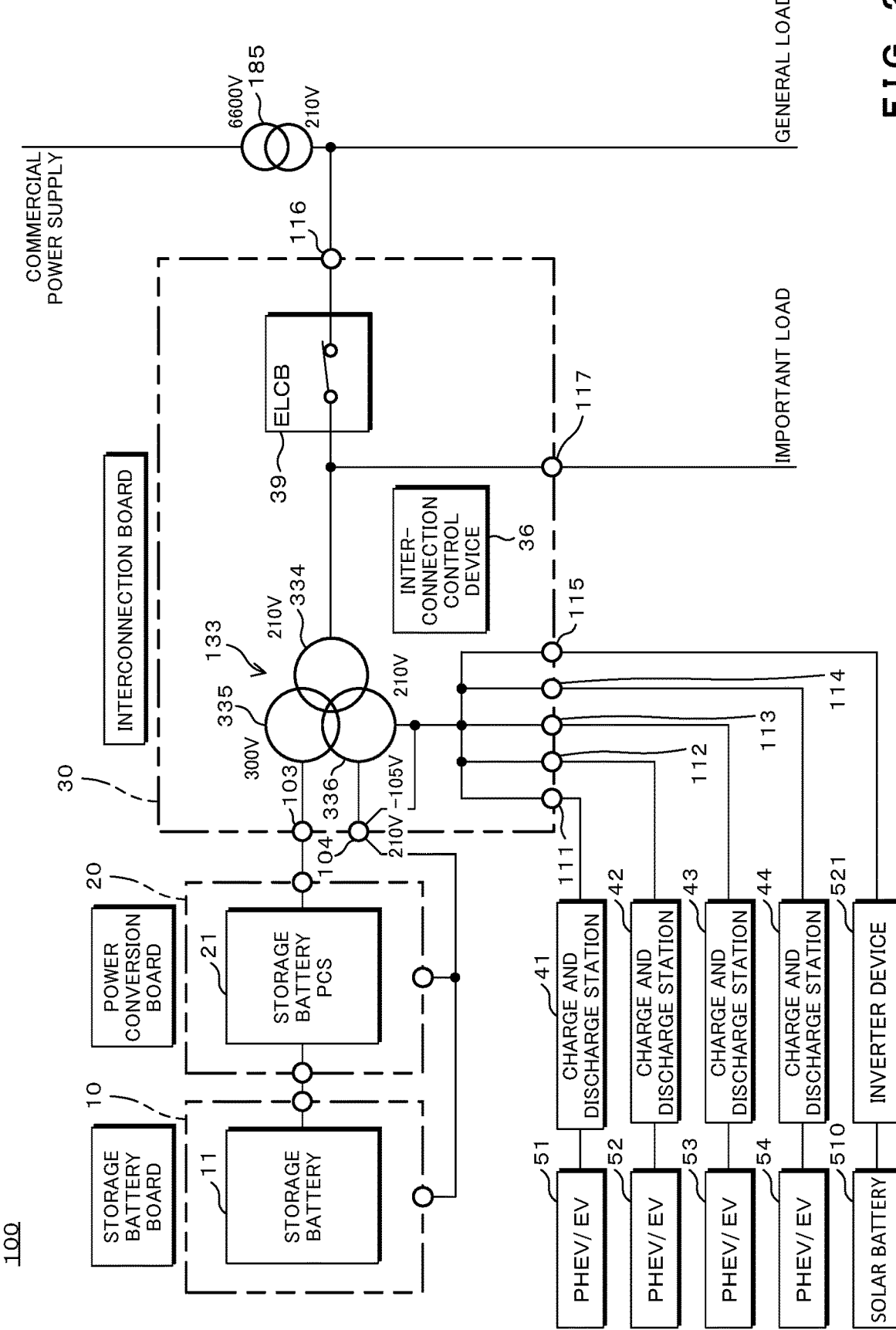
FIG. 21 is a schematic view illustrating one example of the circuit configuration of the power system interconnection system in a low-voltage system.

FIG. 21 is a schematic view illustrating one example of the circuit configuration of the power system interconnection system 100 in a low-voltage system. A step-down transformer 185 is provided on the commercial power supply side, and the step-down transformer 185 steps down the voltage of 6600 V to 210 V for example. The general load is connected to the secondary side of the step-down transformer 185. The power line from the general load is connected to one end side of the breaker 116 of the interconnection board 30. The input side of an ELCB 39 is connected to the other end side of the breaker 116.

The ELCB 39 is an earth leakage circuit breaker, and can detect leakage current due to an electricity leakage and automatically shut off the circuit. The ELCB 39 has a function as a switch unit and can disconnect the commercial power supply from the important load by opening the current path in case of the emergency situation such as an electricity leakage.

The power line extending from the important load is connected to one end side of the breaker 117 of the interconnection board 30. The output side of the ELCB 39 is connected to the other end side of the breaker 117. The output side of the ELCB 39 is connected to the transformer 133. Note that, in the case where the input voltages of the general load and the important load are lower than 210 V the step-down transformer may be provided on the input side of each of the general load and the important load.

The transformer 33 can be a three-phase transformer with three windings, in the case where the interconnection is performed at low voltage, it is necessary to set to be lower than 50 kVA. Thus, the voltage and power (apparent power) on the first winding 334 side can be 210 V and 49 kVA, respectively for example, the voltage and power on the second winding 335 side can be 300 V and 49 kVA, respectively; for example, and the voltage and power on the third winding 336 side can be 210 V and 49 kVA, respectively, for example. The voltage and power are not limited to these values. In addition, the transformer may be configured by two transformers with two windings, but not limited to the transformer with three windings. The employment of the transformer with three-windings as the transformer 133 may save space and reduce weight in comparison with provision of two transformers.

In addition, the entire power of the charge and discharge station 41-44 and the inverter device 521 also needs to be less than 50 kVA. In the example of FIG. 21, the output power of the charge and discharge stations 41-44 is assumed to be 10 kVA while the output power of the inverter device 521 is assumed to be 9 kVA.

In FIG. 21, the components similar to those in FIG. 14 will not be described here by applying the same reference codes. Furthermore, the autonomous operation in the case where the electric power system is in the emergency situation is similar to that in FIG. 17.

In the above-described embodiment, though four charge and discharge stations and one inverter are configured to be provided, the combination in numbers between the charge and discharge stations and the inverter device is not limited thereto. For example, multiple inverter devices may be configured to be provided. In the above-described embodiment, though the solar battery is configured to be installed on the top surface of the carport, a solar battery may be installed on a site other than the carport. The solar battery installed on the parking may be installed near the parking lot so as not to extend the wiring work with the power system interconnection unit, and includes, for example, the roof of a building near the parking lot, a facility installed near the parking lot, or a site near the parking lot.

About Embodiment 1

A power system interconnection system according to the present embodiment is a power system interconnection system with an electric power system including a commercial power supply and comprises a storage battery an AC-DC power conversion device for the storage battery, a charge and discharge station for an electric-powered automobile and an interconnection control device that are installed on a parking lot, and the interconnection control device supplies a first load with power from at least one of the charge and discharge station and the AC-DC power conversion device in a case where the electric power system is in an emergency situation.

A power system interconnection method according to the present embodiment is a power system interconnection method with an electric power system, and comprises: including a storage battery, an AC-DC power conversion device for the storage battery, a charge and discharge station for an electric-powered automobile and an interconnection control device that are installed on a parking lot; and supplying a first load with power from at least one of the charge and discharge station and the AC-DC power conversion device in a case where the electric power system is in an emergency situation.

The power system interconnection system includes a storage battery, an AC-DC power conversion device for the storage battery, a charge and discharge station for an electric-powered automobile and an interconnection control device that are installed on a parking lot. The AC-DC power conversion device can bidirectionally convert power from alternating current to direct current and from direct current to alternating current, and can charge and discharge the storage battery (also referred to as a stationary storage battery). The charge and discharge station can charge and discharge a battery (on-vehicle storage battery) mounted on the electric-powered automobile (PHEV or EV). The interconnection control device performs power system interconnection operation between the electric power system and the AC-DC power conversion device as well as the charge and discharge station in the case where the electric power system is in a normal situation, and performs autonomous operation by the AC-DC power conversion device and the charge and discharge station in the case where the electric power system is in an abnormal situation (when a disaster occurs).

In other words, the power system interconnection system supplies the first load with power from the commercial power supply in the case where the electric power system is in the normal situation.

Furthermore, it can supply the first load with power from the charge and discharge station or the AC-DC power conversion device. The interconnection control device supplies power from at least one of the charge and discharge station and the AC-DC power conversion device to the first load in the case where the electric power system is in the emergency situation. The first load is an important load that needs to be continuously supplied with power even at the time of a disaster and includes, for example, an emergency elevator, electric equipment needing continuous operation, lighting and air-conditioning equipment in a building, etc.

According to the above-mentioned configuration, even if required power cannot be supplied from the charge and discharge stations to the first load since some of the electric-powered automobiles are moving at the time of a disaster, power can be supplied from the AC-DC power conversion device to the first load, and thus required power can be supplied to the load as a whole.

The power system interconnection system according to the present embodiment further comprises a switch unit that opens or closes a current path between the commercial power supply and the first load, and the switch unit is opened to disconnect the commercial power supply from the first load in a case where the electric power system is in an emergency situation.

The power system interconnection system includes a switch unit that opens or closes a current path between the commercial power supply and the first load. The switch unit is a vacuum circuit breaker (VCB), for example, and is a circuit breaker having electrodes of the switch unit in a high-vacuum container that diffuses in high vacuum the material made of arcing developed between the electrodes when current is interrupted, and dissipates the arcing.

The power system interconnection system disconnects the commercial power supply from the first load by opening the electrodes in the switch unit in the case where the electric power system is in the emergency situation. This enables autonomous operation by the interconnection control device.

In the power system interconnection system according to the present embodiment, power is supplied from the commercial power supply to the first load and a second load different from the first load in a case where the electric power system is in a normal situation.

The power system interconnection system supplies the first load and a second load different from the first load with power from the commercial power supply in a case where the electric power system is in a normal situation. The first load is an important load, while the second load is a general load and includes electric equipment that is relatively less affected even if power is shut off at the time of a disaster, for example. The load is separated into two systems of the first load and the second load to thereby make the power supplied at the time of a disaster to a minimum required amount, which enables continuous power supply to the important load and extension of the time capable of supplying the important load with power.

The power system interconnection system according to the present embodiment further comprises an interconnection board including a transformer with three windings having a first winding connected to a commercial power supply side of the power system, a second winding connected to an AC-DC power conversion device side and a third winding connected to a charge and discharge station side.

The interconnection board includes a transformer with three windings having a first winding connected to a commercial power supply side, a second winding connected to an AC-DC power conversion device side and a third winding connected to a charge and discharge station side. The first winding is a winding on the high-pressure side. Though a voltage of 6600 V, for example, is applied to or output from the first winding, the voltage is not limited to 6600 V. The second winding is a winding on the low-pressure side. Though a voltage of 300 V, for example, is applied to or output from the second winding, the voltage is not limited to 300 V. The third winding is a winding on the low-pressure side. Though a voltage of 210 V, for example, is applied to or output from the third winding, the voltage is not limited to 210 V. The employment of the transformer with three-windings may save space and reduce weight in comparison with provision of two transformers.

In the power system interconnection system according to the present embodiment, the interconnection control device supplies, if power that the charge and discharge station is able to supply is above a capacity of the first load, the AC-DC power conversion device with an excess of power from the charge and discharge station in a case where the electric power system is in an emergency situation.

The interconnection control device supplies, if power that the charge and discharge station is able to supply is above a capacity of the first load, the AC-DC power conversion device with an excess of power from the charge and discharge station in a case where the electric power system is in an emergency situation. This enables effective use of the power of the electric-powered automobile if some of the electric-powered automobile are parked in the parking space and are not moving.

In the power system interconnection system according to the present embodiment, the interconnection control device supplies, if power that the charge and discharge station is able to supply is below a capacity of the first load, the first load with power from both of the charge and discharge station and the AC-DC power conversion device in a case where the electric power system is in an emergency situation.

The interconnection control device supplies, if power that the charge and discharge station is able to supply is below a capacity of the first load, the first load with power from both of the charge and discharge station and the AC-DC power conversion device in a case where the electric power system is in an emergency situation. This makes it possible to supply a deficient amount of power from the AC-DC power conversion device if all or part of the required electric-powered automobiles are moving and are not in the parking space, resulting in supply of required power to the load.

The power system interconnection system according to the present embodiment further comprises a report unit that reports information on charge and discharge of a battery of an electric-powered automobile by the charge and discharge station.

The report unit reports information on charge and discharge of the battery of an electric-powered automobile by the charge and discharge station. The report unit can be provided on the charge and discharge station, and may be a display panel or an indicator light or may report the information to a terminal device used by the user or the manager via a wireless communication, for example. This can timely provide the user with the information on the charge and discharge of the electric-powered automobile.

In the power system interconnection system according to the present embodiment, the interconnection control device charges an electric-powered automobile by the charge and discharge station in a case where the electric power system is in a normal situation and where a charge mode is set.

The interconnection control device charges the electric-powered automobile by the charge and discharge station in the case where the electric power system is in the normal situation and where a charge mode is set. This makes it possible to utilize the interconnection control device as fast charging stations for the electric-powered automobiles.

In the power system interconnection system according to the present embodiment, the interconnection control device, if power-receiving point power measured at a predetermined site is equal to or more than a threshold, supplies the first load and the second load with power from the charge and discharge station, or supplies the first load and the second load with power from the AC-DC power conversion device in a state where the electric power system is in a normal situation and where an energy management mode is set.

The interconnection control device, if power-receiving point power measured at a predetermined site is equal to or more than a threshold, supplies the first load and the second load with power from the charge and discharge station, or supplies the first load and the second load with power from the AC-DC power conversion device in a state where the electric power system is in a normal situation and where an energy management mode is set.

This enables peak-cut operation of power.

In the power system interconnection system according to the present embodiment, the interconnection control device makes an uninterruptible switching from power supplied from at least one of the charge and discharge station and the AC-DC power conversion device to the first load to power supplied from the commercial power supply in a case where the electric power system is restored.

The interconnection control device makes an uninterruptible switching from power supplied from at least one of the charge and discharge station and the AC-DC power conversion device to the first load to power supplied from the commercial power supply in a case where the electric power system is restored. The uninterruptible switching is performed by, for example, turning on the commercial power supply when the phase of the commercial power supply is synchronized with the phase of alternating current output by the AC-DC power conversion device, which allows for stable power supply to the first load even when the electrical power system is restored from the disaster.

The power system interconnection system according to the present embodiment is used for a business continuity plan.

This makes it possible to use power system interconnection system as equipment for a business continuity plan (BCP).

About Embodiment 2

A power system interconnection system according to the present embodiment is a power system interconnection system with an electric power system and comprises: a charge and discharge station for an electric-powered automobile installed on a parking lot; and a power system interconnection unit installed on the parking lot, and the power system interconnection unit includes a storage battery board containing a storage battery a power conversion board containing an AC-DC power conversion device for the storage battery, and an interconnection board containing an interconnection control device for performing power system interconnection with the electric power system.

A power system interconnection unit according to the present embodiment is an power system interconnection unit with an electric power system and comprises: a storage battery board that is installed on a parking lot and contains a storage battery; a power conversion board that is installed on the parking lot and contains an AC-DC power conversion device for the storage battery; and an interconnection board that is installed on the parking lot and contains an interconnection control device performing power system interconnection with the electric power system.

A power system interconnection system comprises a charge and discharge station for an electric-powered automobile installed on a parking lot; and a power system interconnection unit installed on the parking lot. The power system interconnection unit comprises a storage battery board that contains a storage battery, a power conversion board that contains an AC-DC power conversion device for a storage battery and an interconnection board that contains an interconnection control device performing power system interconnection with the electric power system. The charge and discharge station can charge and discharge a battery (on-vehicle storage battery) mounted on the electric-powered automobile (PHEV or EV). The AC-DC power conversion device can bidirectionally convert power from alternating current to direct current and from direct current to alternating current, and can charge and discharge the storage battery (also referred to as a stationary storage battery). The interconnection control device performs power system interconnection operation between the electric power system and the AC-DC power conversion device as well as the charge and discharge station in the ease where the electric power system is in a normal situation, and performs autonomous operation by the AC-DC power conversion device and the charge and discharge station in the case where the electric power system is in an abnormal situation (when a disaster occurs).

The charge and discharge stations and the power system interconnection unit are installed on the parking lot. If required power cannot be supplied from the charge and discharge stations to a load since all or part of the electric-powered automobiles are moving and are thus not in the parking lot at the time of a disaster, the power in the storage battery can be supplied to the load by the AC-DC power conversion device, and thus required power can be supplied to the load as a whole.

In the power system interconnection system according to the present embodiment, the storage battery board, the power conversion board and the interconnection board are arranged so as to be aligned in a direction of a length of a vehicle in a parking space.

The storage battery board, the power conversion board and the interconnection board are arranged so as to be aligned along the direction of the length of a vehicle of the parking space. The storage battery board, the power conversion board, and the interconnection board are arranged so as to be aligned in the direction of the vehicle length of the parking space arranged in parallel for each electric-powered automobile in the parking lot, whereby the power system interconnection unit can be arranged in a parking space having a size of approximately one electric-powered automobile, for example, which can reduce the ground area required for the parking lot inclusive of the power system interconnection unit. Moreover, the distance between the power system interconnection unit and the charge and discharge stations can be shortened, which can facilitate wiring work and burying work of a power line and a communication and control line and reduce the cost of such works.

In the power system interconnection system according to the present embodiment, the storage battery board, the power conversion hoard and the interconnection board each have an openable door at a front surface on a same side as the parking space.

The storage battery board, the power conversion hoard and the interconnection board each have an openable door at a front surface on a same side as the parking space. A worker can open each of the openable doors for working when performing maintenance and checkups on the storage battery board, the power conversion board and the interconnection board. For example, the electric-powered automobile parked in the parking space adjacent to the respective openable doors of the storage battery board, the power conversion board and the interconnection board is moved from the parking space to make this parking space available, which allows this parking space to be utilized for a working space to perform maintenance and checkup on the power system interconnection unit. This can eliminate the need for installing the power system interconnection unit while the work space for maintenance and checkup is previously ensured, and reduce the area taken up by the power system interconnection unit inclusive of the work space.

In the power system interconnection system according to the present embodiment, the storage battery board and the power conversion board each have an air intake and exhaust opening at a rear surface on a side opposite to the parking space.

The storage battery board and the power conversion board each have an air intake and exhaust opening at a rear surface on a side opposite to the parking space. The storage battery board contains a cooling device and a heater for managing the temperature of the storage battery other than the storage battery. The power conversion board contains a cooling device for heat dissipation of the AC-DC power conversion device other than the AC-DC power conversion device. The provision of the air intake and exhaust openings at the rear surface on the side opposite to the parking space can prevent hot air from being blown to the user at the parking space and can avoid making the user feel uncomfortable.

In the power system interconnection system according to the present embodiment, the storage battery board, the power conversion board and the interconnection board each have a plate thickness of 2.3 mm or more.

The storage battery board, the power conversion board and the interconnection board each have a plate thickness of 2.3 mm or more. Generally for cubicle type high voltage receiving equipment (hereinafter also simply referred to as a cubicle), a metal plate being approximately 1.6 mm in thickness is used. In this case, under a fire prevention ordinance, the cubicle needs to be installed 3 m or more away from the building. Setting the plate thickness to 2.3 mm or more eliminates the restriction on the clearance from the building of 3 m or more. This allows the power system interconnection unit to be installed without taking into account the restriction on the clearance from a building even in the parking lot adjacent, to buildings, which enables greater freedom of installation of the power system interconnection unit, resulting in easy installation.

In the power system interconnection system according to the present embodiment, a switch unit is opened to disconnect a commercial power supply from a predetermined load in a case where the electric power system is in an emergency situation.

The power system interconnection system opens the switch unit to disconnect a commercial power supply from a predetermined load in a case where the electric power system is in an emergency situation. This enables autonomous operation by the interconnection control device.

In the power system interconnection system according to the present embodiment, the interconnection control device supplies the predetermined load with power from any one of the charge and discharge station and the AC-DC power conversion device in a case where the electric power system is in an emergency situation.

The interconnection control device supplies the predetermined load with power from at least one of the charge and discharge station and the AC-DC power conversion device in a case where the electric power system is in an emergency situation. The predetermined load is an important load that needs to be continuously supplied with power even at the time of a disaster and includes, for example, an emergency elevator, electric equipment needing continuous operation, lighting and air-conditioning equipment in a building, etc.

According to the above-mentioned configuration, even if required power cannot be supplied from the charge and discharge stations to the predetermined load since some of the electric-powered automobiles are moving at the time of a disaster, power can be supplied from the AC-DC power conversion device to the predetermined load, and thus required power can be supplied to the load as a whole.

In the power system interconnection system according to the present embodiment, the interconnection control device supplies, if power that the charge and discharge station is able to supply is above a capacity of the predetermined load, the AC-DC power conversion device with an excess of power from the charge and discharge station in a case where the electric power system is in an emergency situation.

The interconnection control device supplies, if power that the charge and discharge station is able to supply is above a capacity of the predetermined load (important load), the AC-DC power conversion device with an excess of power from the charge and discharge station in a case where the electric power system is in an emergency situation. This enables effective use of the power of the electric-powered automobile if some of the electric-powered automobile are parked in the parking space and are not moving.

In the power system interconnection system according to the present embodiment, the interconnection control device supplies, if power that the charge and discharge station is able to supply is below a capacity of the predetermined load, the predetermined load with power from both of the charge and discharge station and the AC-DC power conversion device in a case where the electric power system is in an emergency situation.

The interconnection control device supplies, if power that the charge and discharge station is able to supply is below a capacity of the predetermined load (important load), the predetermined load with power from both of the charge and discharge station and the AC-DC power conversion device in a case where the electric power system is in an emergency situation. This makes it possible to supply a deficient amount of power from the AC-DC power conversion device if all or part of the required electric-powered automobiles are moving and are not in the parking space, resulting in supply of required power to the load.

The power system interconnection system according to the present embodiment further comprises a decorative wall fixed on a base on which the power system interconnection unit is installed so as to surround a periphery of the power system interconnection unit.

The decorative wall is fixed on a base on which the power system interconnection unit is installed so as to surround the periphery of the power system interconnection unit. The decorative wall can be used as a message sign on which an advertisement, an art, etc. are displayed. The decorative wall can be built high enough to prevent the power system interconnection system from showing. The appearance of the power system interconnection system is highly likely to give a sense of discomfort to the user in a shopping mall and the public place if the power system interconnection unit is surrounded by the decorative wall, the user may feel no discomfort and receive information that attracts the interest of the user.

In the power system interconnection system according to the present embodiment, the decorative wall is openable at a front surface on a same side as the parking space.

The front surface of the decorative wall is openable. This makes it possible to perform maintenance and checkup on the power system interconnection unit even if the power system interconnection system is surrounded by the decorative wall.

In the power system interconnection system according to the present embodiment, the decorative wall is provided with an opening for air intake and exhaust at a rear surface on a side opposite to the parking space.

At the rear surface of the decorative wall on a side opposite to the parking space, an opening for air intake and exhaust is provided.

This makes it possible to cool the power system interconnection system even if the power system interconnection system is surrounded by the decorative wall.

The power system interconnection system according to the present embodiment is used for a business continuity plan.

This makes it possible to cool the power system interconnection system as equipment for a business continuity plan (BCP).

A method of installing a power system interconnection system according to the present embodiment is a method of installing a power system interconnection system with an electric power system, comprises: installing, on a base provided on a ground of a parking lot, a storage battery board containing a storage battery, a power conversion board containing an AC-DC power conversion device for the storage battery and an interconnection board containing an interconnection control device that performs power system interconnection with the electric power system so as to be aligned, connecting a cable extending from a commercial power supply through a high voltage cable inlet opening of the interconnection board, connecting a cable to a predetermined load through a high voltage cable outlet opening of the interconnection board, and connecting a cable extending from a charge and discharge station for an electric-powered automobile through a low voltage cable outlet opening of the interconnection board.

The method of installing the power system interconnection system comprises installing in a line, on a base provided on a ground of a parking lot, a storage battery board containing a storage battery, a power conversion board containing an AC-DC power conversion device for the storage battery and an interconnection board containing an interconnection control device that performs power system interconnection with the electric power system. The power system interconnection unit is divided into three installation boards of the storage battery board, the power conversion board and the interconnection board. This eliminates the need for a large transport vehicle when the storage battery board, the power conversion board and the interconnection board are carried in an installation site. This also eliminates the need for large heavy equipment when the storage battery board, the power conversion board and the interconnection board are lifted and moved to an installation site. Especially, in a shopping mall where an indefinite number of customers come and go, this can prevent the customers from having inconvenience and a bad impression when these boards are installed at a parking lot.

The method of installing the power system interconnection system comprises connecting a cable extending from a commercial power supply through a high voltage cable inlet opening of the interconnection board, connecting a cable extending to a predetermined load through a high voltage cable outlet opening of the interconnection board, and connecting a cable extending from a charge and discharge station for an electric-powered automobile through a low voltage cable outlet opening of the interconnection board. The cable includes a power line and a communication and control line. Note that the cables can have been wired through pipes previously buried underground.

The above-described configuration enables an installation work of the power system interconnection unit in a relatively short time, which can reduce the construction cost.

The method of installing a power system interconnection system according to the present embodiment comprises installing in a line the storage battery board, the power conversion board and the interconnection board in a direction of a length of a vehicle in a parking space.

The method of installing a power system interconnection system installs in a line the storage battery board, the power conversion board and the interconnection board along a direction of a length of a vehicle in a parking space. The storage battery board, the power conversion board and the interconnection board are arranged so as to be aligned along the direction of the length of a vehicle of the parking space. The storage battery board, the power conversion board, and the interconnection board are arranged so as to be aligned in the direction of the vehicle length of the parking space arranged in parallel for each electric-powered automobile in the parking lot, whereby the power system interconnection unit can be arranged in a parking space having a size of approximately one electric-powered automobile, for example, which can reduce the ground area required for the parking lot inclusive of the power system interconnection unit. Moreover, the distance between the power system interconnection unit and the charge and discharge stations can be shortened, which can facilitate wiring work and burying work of a power line and a communication and control line and reduce the cost of such works.

The method of installing a power system interconnection system according to the present embodiment comprises installing the storage battery board, the power conversion board and the interconnection board such that respective openable doors mounted to the storage battery board, the power conversion board and the interconnection board face a same side as the parking space.

The method of installing a power system interconnection system comprises installing the storage battery board, the power conversion board and the interconnection board such that respective openable doors mounted to the storage battery board, the power conversion board and the interconnection board face a same side as the parking space. A worker can open each of the openable doors for working when performing maintenance and checkups on the storage battery board, the power conversion board and the interconnection board. For example, the electric-powered automobile parked in the parking space adjacent to the respective openable doors of the storage battery board, the power conversion board and the interconnection board is moved from the parking space to make this parking space available, which allows this parking space to be utilized for a working space to perform maintenance and checkup on the power system interconnection unit. This can eliminate the need for installing the power system interconnection unit while the work space for maintenance and checkup is previously ensured, resulting in reduction of the area taken up by the power system interconnection unit inclusive of the work space.

The method of installing a power system interconnection system according to the present embodiment comprises installing a plurality of the charge and discharge stations in a line on a base provided on a ground of the parking lot.

The method of installing a power system interconnection system comprises installing a plurality of charge and discharge stations in a line on a base provided on a ground of the parking lot. This can shorten the distance between the power system interconnection unit and the charge and discharge stations, which can facilitate wiring work and burying work of a power line and a communication and control line and reduce the cost of such works.

About Embodiment 3

A power system interconnection system according to the present embodiment is a power system interconnection system with an electric power system including a commercial power supply and comprises a storage battery installed on a parking lot, an AC-DC power conversion device for the storage battery; a charge and discharge station for an electric-powered automobile, an inverter device for a solar battery and an interconnection control device, and the interconnection control device supplies a first load with power from at least one of the charge and discharge station as well as the inverter device and the AC-DC power conversion device in a case where the electric power system is in an emergency situation.

A power system interconnection method according to the present embodiment, is a power system interconnection method with an electric power system and comprises: including a storage battery an AC-DC power conversion device for the storage battery a charge and discharge station for an electric-powered automobile, a solar battery, an inverter device for the solar battery and an interconnection control device that are installed on a parking lot; and supplying a predetermined load with power from at least one of the charge and discharge station as well as the inverter device and the AC-DC power conversion device in a case where the electric power system is in an emergency situation.

The power system interconnection system comprises a storage battery an AC-DC power conversion device for the storage battery, a charge and discharge station for an electric-powered automobile, a solar battery, an inverter device for the solar battery and an interconnection control device that are installed on a parking lot. The AC-DC power conversion device can bidirectionally convert power from alternating current to direct current and from direct current to alternating current, and can charge and discharge the storage battery (also referred to as a stationary storage battery). The charge and discharge station can charge and discharge a battery (on-vehicle storage battery) mounted on the electric-powered automobile (PHEV or EV). The inverter device can convert power from direct current to alternating current and can discharge the solar battery. The interconnection control device performs power system interconnection operation between the electric power system and the AC-DC power conversion device, the charge and discharge station as well as the inverter device in the case where the electric power system is in a normal situation, and performs autonomous operation by the AC-DC power conversion device, the charge and discharge station and the inverter device in the case where the electric power system is in an abnormal situation (when a disaster occurs).

In other words, the power system interconnection system supplies the first load (predetermined load) with power from the commercial power supply in the case where the electric power system is in the normal situation. Furthermore, it can supply power from the charge and discharge station and the inverter device or the AC-DC power conversion device to the first load. The interconnection control device supplies the first load with power from at least one of the charge and discharge station as well as the inverter device and the AC-DC power conversion device in the case where the electric power system is in the emergency situation. The first load is an important load that needs to be continuously supplied with power even at the time of a disaster and includes, for example, an emergency elevator, electric equipment needing continuous operation, lighting and air-conditioning equipment in a building, etc.

According to the above-mentioned configuration, even if required power cannot be supplied from the charge and discharge stations and the inverter device to the first load since some of the electric-powered automobiles are moving at the time of a disaster, power can be supplied from the AC-DC power conversion device to the first load, and thus required power can be supplied to the load as a whole.

The power system interconnection system according to the present embodiment further comprises a switch unit that opens or closes a current path between the commercial power supply and the first load, and the switch unit is opened to disconnect the commercial power supply from the first load in a case where the electric power system is in an emergency situation.

The power system interconnection system includes a switch unit that opens or closes a current path between the commercial power supply and the first load. The switch unit is a vacuum circuit breaker (VCB), for example, and is a circuit breaker having electrodes of the switch unit in a high-vacuum container that diffuses in high vacuum the material made of arcing developed between the electrodes when current is interrupted, and dissipates the arcing.

The power system interconnection system disconnects the commercial power supply from the first load by opening the electrodes in the switch unit in the case where the electric power system is in the emergency situation. This enables autonomous operation by the interconnection control device.

In the power system interconnection system according to the present embodiment, power is supplied from the commercial power supply to the first load and a second load different from the first load in a case where the electric power system is in a normal situation.

The power system interconnection system supplies the first load and a second load different from the first load with power from the commercial power supply in a case where the electric power system is in a normal situation. The first load is an important load while the second load is a general load and includes electric equipment that is relatively less affected even if power is shut off at the time of a disaster. The load is separated into two systems of the first load and the second load to thereby make the power supplied at the time of a disaster to a minimum required amount, which enables continuous power supply to the important load and extension of the time capable of supplying the important load with power.

The power system interconnection system according to the present embodiment, further comprises an interconnection board including a transformer with three windings having a first winding connected to a commercial power supply side of the power system, a second winding connected to an AC-DC power conversion device side, and a third winding connected to a charge and discharge station side and an inverter device side.

The interconnection board includes a transformer with three windings having a first winding connected to a commercial power supply side, a second winding connected to an AC-DC power conversion device side and a third winding connected to a charge and discharge station side. The first winding is a winding on the high-pressure side. Though a voltage of 6600 V for example, is applied to or output from the first winding, the voltage is not limited to 6600 V. The second winding is a winding on the low-pressure side. Though a voltage of 300 V, for example, is applied to or output from the second winding, the voltage is not limited to 300 V. The third winding is a winding on the low-pressure side. Though a voltage of 210 V for example, is applied to or output from the third winding, the voltage is not limited to 210 V. The employment of the transformer with three-windings may save space and reduce weight in comparison with provision of two transformers.

In the power system interconnection system according to the present embodiment, the interconnection control device supplies, if power that the charge and discharge station and the inverter device are able to supply is above a capacity of the first load, the AC-DC power conversion device with an excess of power from the charge and discharge station and the inverter device in a case where the electric power system is in an emergency situation.

The interconnection control device supplies, if power that the charge and discharge station and the inverter device are able to supply is above a capacity of the first load, the AC-DC power conversion device with an excess of power from the charge and discharge station and the inverter device in a case where the electric power system is in an emergency situation. This enables effective use of the power of the electric-powered automobile if some of the electric-powered automobiles are parked in the parking space and are not moving.

In the power system interconnection system according to the present embodiment, the interconnection control device supplies, if power that the charge and discharge station and the inverter device are able to supply is below a capacity of the first load, the first load with power from both of the charge and discharge station as well as the inverter device and the AC-DC power conversion device in a case where the electric power system is in an emergency situation.

The interconnection control device supplies, if power that the charge and discharge station and the inverter device are able to supply is below a capacity of the first load, the first load with power from both of the charge and discharge station as well as the inverter device and the AC-DC power conversion device in a case where the electric power system is in an emergency situation. This makes it possible to supply a deficient amount of power from the AC-DC power conversion device if all or part of the required electric-powered automobiles are moving and are not in the parking space, resulting in supply of required power to the load.

The power system interconnection system according to the present embodiment, further comprises an interconnection board including a transformer with three windings having a first winding connected to a commercial power supply side of the power system and an inverter device side, a second winding connected to an AC-DC power conversion device side, and a third winding connected to a charge and discharge station side.

The interconnection board includes a transformer with three windings having a first winding connected to a commercial power supply side and an inverter device side, a second winding connected to an AC-DC power conversion device side and a third winding connected to a charge and discharge station side. The first winding is a winding on the high-pressure side. Though a voltage of 6600 V, for example, is applied to or output from the first winding, the voltage is not limited to 6600 V. The second winding is a winding on the low-pressure side. Though a voltage of 300 V, for example, is applied to or output from the second winding, the voltage is not limited to 300 V. The third winding is a winding on the low-pressure side. Though a voltage of 210 V for example, is applied to or output from the third winding, the voltage is not limited to 210 V. The employment of the transformer with three-windings may save space and reduce weight in comparison with provision of two transformers.

In the power system interconnection system according to the present embodiment, the interconnection control device supplies, if power that the inverter device is able to supply is above a capacity of the first load, the charge and discharge station or the AC-DC power conversion device with an excess of power from the inverter device in a case where the electric power system is in an emergency situation.

The interconnection control device supplies, if power that the inverter device is able to supply is above a capacity of the first load, an excess of power from the inverter device to the charge and discharge station or the AC-DC power conversion device in a case where the electric power system is in an emergency situation. This makes it possible to make effective use of the power produced by the solar battery.

In the power system interconnection system according to the present embodiment, the interconnection control device, if power that the inverter device is able to supply is below a capacity of the first load, supplies the first load with power from the inverter device and the charge and discharge station, or supplies the first load with power from the inverter device, the charge and discharge station and the AC-DC power conversion device in a case where the electric power system is in an emergency situation.

The interconnection control device, if power that the inverter device is able to supply is below a capacity of the first load, supplies the first load with power from the inverter device and the charge and discharge station in a case where the electric power system is in an emergency situation, or supplies the first load with power from the inverter device, the charge and discharge station and the AC-DC power conversion device. This makes it possible to supply a deficient amount of power from the charge and discharge station or the AC-DC power conversion device even if power supply from the solar battery is deficient, resulting in supply of required power to the load.

The power system interconnection system according to the present embodiment further comprises a report unit that reports information on charge and discharge of a battery of an electric-powered automobile by the charge and discharge station and discharge of a solar battery by the inverter device.

The report unit reports information on charge and discharge of the battery of an electric-powered automobile by the charge and discharge station and information on discharge of a solar battery by the inverter device. The report unit can be provided on the charge and discharge station, and may be a display panel or an indicator light or may report the information to a terminal device used by the user or the manager via a wireless communication, for example. This can timely provide the user with the information on the charge and discharge of the electric-powered automobile and the information on discharge of the solar battery.

In the power system interconnection system according to the present embodiment, the interconnection control device charges an electric-powered automobile by the charge and discharge station in a case where the electric power system is in a normal situation and where a charge mode is set.

The interconnection control device charges the electric-powered automobile by the charge and discharge station in the case where the electric power system is in the normal situation and where a charge mode is set. This makes it possible to utilize the interconnection control device as fast charging stations for the electric-powered automobiles.

In the power system interconnection system according to the present embodiment, the interconnection control device, if power-receiving point power measured at a predetermined site is equal to or more than a threshold, supplies the first load and the second load with power from the charge and discharge station and the inverter device, or supplies the first load and the second load with power from the AC-DC power conversion device in a state where the electric power system is in a normal situation and where an energy management mode is set.

The interconnection control device, if power-receiving point power measured at a predetermined site is equal to or more than a threshold, supplies the first load and the second load with power from the charge and discharge station and the inverter device, or supplies the first load and the second load with power from the AC-DC power conversion device in a state where the electric power system is in a normal situation and where an energy management mode is set. This enables peak-cut operation of power.

In the power system interconnection system according to the present embodiment, the interconnection control device makes an uninterruptible switching from power supplied from at least one of the charge and discharge station, the inverter device and the AC-DC power conversion device to the first load to power supplied from the commercial power supply in a case where the electric power system is restored.

The interconnection control device makes an uninterruptible switching from power supplied from at least one of the charge and discharge station, the inverter device and the AC-DC power conversion device to the first load to power supplied from the commercial power supply in a case where the electric power system is restored. The uninterruptible switching is performed by, for example, turning on the commercial power supply when the phase of the commercial power supply is synchronized with the phase of alternating current output by the AC-DC power conversion device, which allows for stable power supply to the first load even when the electrical power system is restored from the disaster.

A power system interconnection system according to the present embodiment comprises: a charge and discharge station for an electric-powered automobile installed on a parking lot; a solar battery that is installed on the parking lot; an inverter device that is installed on the parking lot and converts direct current output from the solar battery to alternating current; and a power system interconnection unit that is installed on the parking lot, and the power system interconnection unit includes a storage battery board containing a storage battery, a power conversion board containing an AC-DC power conversion device for the storage battery and an interconnection board containing an interconnection control device for performing power system interconnection between the electric power system and the charge and discharge station or the inverter device.

The power system interconnection system according to the present embodiment is used for a business continuity plan.

This makes it possible to use power system interconnection system as equipment for a business continuity plan (BCP).

A power system interconnection unit according to the present embodiment is a power system interconnection unit with an electric power system, comprises: a storage battery board that is installed on a parking lot and contains a storage battery; a power conversion board that is installed on the parking lot and contains an AC-DC power conversion device for the storage battery and an interconnection board that is installed on the parking lot and contains an interconnection control device performing power system interconnection between the electric power system and the charge and discharge station or the inverter device.

A power system interconnection system comprises a charge and discharge station for an electric-powered automobile installed on a parking lot; a solar battery installed on the parking lot; an inverter device that converts direct current output by the solar battery to alternating current; and a power system interconnection unit installed on the parking lot. The power system interconnection unit comprises a storage battery board that contains a storage battery, a power conversion board that contains an AC-DC power conversion device for the storage battery and an interconnection board that contains an interconnection control device performing power system interconnection with the electric power system. The charge and discharge station can charge and discharge a battery (on-vehicle storage battery) mounted on the electric-powered automobile (PHEV or EV). The inverter device can convert the power of the solar battery to alternating current and discharge the energy of the solar battery. The AC-DC power conversion device can bidirectionally convert power from alternating current to direct current and from direct current to alternating current, and can charge and discharge the storage battery (also referred to as a stationary storage battery). The interconnection control device performs power system interconnection operation between the electric power system and the AC-DC power conversion device as well as the charge and discharge station in the case where the electric power system is in a normal situation, and performs autonomous operation by the AC-DC power conversion device and the charge and discharge station in the case where the electric power system is in an abnormal situation (when a disaster occurs).

The charge and discharge stations, the inverter device and the power system interconnection unit are installed on the parking lot. If required power cannot be supplied from the charge and discharge stations to a load since all or part of the electric-powered automobiles are moving and are thus not in the parking lot at the time of a disaster, or if sufficient power cannot be supplied from the solar battery the power in the storage battery can be supplied to the load by the AC-DC power conversion device, and thus required power can be supplied to the load as a whole.

A method of installing a system according to the present embodiment is a method of installing an interconnection system with an electric power system and comprises installing in a line, on a base provided on a ground of a parking lot, a storage battery board containing a storage battery, a power conversion board containing an AC-DC power conversion device for the storage battery and an interconnection board containing an interconnection control device that performs power system interconnection with the electric power system so as to be aligned, connecting a cable extending from a commercial power supply through a high voltage cable inlet opening of the interconnection board, connecting a cable to a predetermined load through a high voltage cable outlet opening of the interconnection board, and connecting a cable extending from a charge and discharge station for an electric-powered automobile and a cable extending from an inverter device for a solar battery through a low voltage cable outlet opening of the interconnection board.

The method of installing the power system interconnection system comprises installing in a line, on a base provided on a ground of a parking lot, a storage battery board containing a storage battery, a power conversion board containing an AC-DC power conversion device for the storage battery, and an interconnection board containing an interconnection control device that performs power system interconnection with the electric power system. The power system interconnection unit is divided into three installation boards of the storage battery board, the power conversion board and the interconnection board. This eliminates the need for a large transport vehicle when the storage battery board, the power conversion board and the interconnection board are carried in an installation site. This also eliminates the need for large heavy equipment when the storage battery board, the power conversion hoard and the interconnection board are lifted and moved to an installation site. Especially in a shopping mall where an indefinite number of customers come and go, this can prevent the customers from having inconvenience and a bad impression when these boards are installed at a parking lot.

The method of installing the power system interconnection system comprises connecting a cable extending from a commercial power supply through a high voltage cable inlet opening of the interconnection board, connecting a cable extending to a predetermined load through a high voltage cable outlet opening of the interconnection board, and connecting a cable extending from a charge and discharge station for an electric-powered automobile and the inverter device for the solar battery through a low voltage cable outlet opening of the interconnection board. The cable includes a power line and a communication and control line. Note that the cables can have been wired through pipes previously buried underground.

The above-described configuration enables an installation work of the power system interconnection unit in a relatively short time, which can reduce the construction cost of the power system interconnection unit.

It is noted that at least parts of the above-mentioned embodiments may arbitrarily be combined.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power system interconnection system with an electric power system including a commercial power supply, comprising:
  a storage battery,
  an AC-DC power conversion device for the storage battery, and
  a charge and discharge station for an electric-powered automobile and an interconnection control device that are installed on a parking lot, wherein
  the commercial power supply is configured to supply power to a second load and a first load that requires a higher need for power supply than the second load,
  each of the first load and the second load is neither a storage battery nor a charge and discharge station for an electric-powered automobile,
  further comprising a switch unit that opens or closes a current path between the commercial power supply and the first load, wherein
  the switch unit is opened to disconnect the commercial power supply from the first load in a case where the electric power system is in an emergency situation,
  the interconnection control device supplies only the first load of the first load and the second load with power from at least one of the charge and discharge station and the AC-DC power conversion device in a case where the electric power system is in an emergency situation, and
  power is supplied from the commercial power supply to both the first load and the second load in a case where the electric power system is in a normal situation.

2. The power system interconnection system according to claim 1, further comprising an interconnection board including a transformer with three windings having a first winding connected to a commercial power supply side of the power system, a second winding connected to an AC-DC power conversion device side and a third winding connected to a charge and discharge station side.

3. The power system interconnection system according to claim 1, wherein the interconnection control device supplies surplus power from the charge and discharge station to the AC-DC power conversion device, if power that the charge and discharge station is able to supply is above a capacity of the first load, in a case where the electric power system is in an emergency situation.

4. The power system interconnection system according to claim 1, wherein the interconnection control device supplies, if power that the charge and discharge station is able to supply is below a capacity of the first load, the first load with power from both of the charge and discharge station and the AC-DC power conversion device in a case where the electric power system is in an emergency situation.

5. The power system interconnection system according to claim 1, further comprising a report unit that reports information on charge and discharge of a battery of an electric-powered automobile by the charge and discharge station.

6. The power system interconnection system according to claim 1, wherein the interconnection control device charges an electric-powered automobile by the charge and discharge station in a case where the electric power system is in a normal situation and where a charge mode is set.

7. The power system interconnection system according to claim 1, wherein the interconnection control device, if power-receiving point power measured at a predetermined site is equal to or more than a threshold, supplies the first load and the second load with power from the charge and discharge station, or supplies the first load and the second load with power from the AC-DC power conversion device in a state where the electric power system is in a normal situation and where an energy management mode is set.

8. The power system interconnection system according to claim 1, wherein the interconnection control device makes an uninterruptible switching from power supplied from at least one of the charge and discharge station and the AC-DC power conversion device to the first load to power supplied from the commercial power supply in a case where the electric power system is restored.

9. A method of installing a power system interconnection system with an electric power system, comprising:
installing in a line, on a base provided on a ground of a parking lot:
a storage battery board containing a storage battery,
a power conversion board containing an AC-DC power conversion device for the storage battery, and
an interconnection board containing an interconnection control device that performs power system interconnection with the electric power system,
connecting a cable extending from a commercial power supply through a high voltage cable inlet opening of the interconnection board,
connecting a cable extending to a predetermined load through a high voltage cable outlet opening of the interconnection board,
connecting a cable extending from a charge and discharge station for an electric-powered automobile through a low voltage cable outlet opening of the interconnection board, and
installing in a line the storage battery board, the power conversion board and the interconnection board in a direction of a length of a vehicle in a parking space wherein
the commercial power supply is configured to supply power to a second load and a first load that requires a higher need for power supply than the second load;
each of the first load and the second load is not a storage battery, a charge and discharge station for an electric-powered automobile, or an inverter device for a solar cell, each of the first load and the second load is neither a storage battery nor a charge and discharge station for an electric-powered automobile,
the interconnection control device supplies only the first load of the first load and the second load with power from at least one of the charge and discharge station, and the AC-DC power conversion device in a case where the electric power system is in an emergency situation, and
power is supplied from the commercial power supply to both the first load and the second load in a case where the electric power system is in a normal situation.

10. A power system interconnection system with an electric power system including a commercial power supply, comprising:
a storage battery,
an AC-DC power conversion device for the storage battery,
a charge and discharge station for an electric-powered automobile, an inverter device for a solar cell and an interconnection control device that are installed on a parking lot, wherein
the commercial power supply is configured to supply power to a second load and a first load that requires a higher need for power supply than the second load,
each of the first load and the second load is not a storage battery, a charge and discharge station for an electric-powered automobile, or an inverter device for a solar cell,
further comprising a switch unit that opens or closes a current path between the commercial power supply and the first load, wherein
the switch unit is opened to disconnect the commercial power supply from the first load in a case where the electric power system is in an emergency situation,
the interconnection control device supplies only the first load of the first load and the second load with power from at least one of the charge and discharge station, the inverter device and the AC-DC power conversion device in a case where the electric power system is in an emergency situation, and
power is supplied from the commercial power supply to both the first load and the second load in a case where the electric power system is in a normal situation.

11. The power system interconnection system according to claim 10, further comprising an interconnection board including a transformer with three windings having a first winding connected to a commercial power supply side of the power system, a second winding connected to an AC-DC power conversion device side, and a third winding connected to a charge and discharge station side and an inverter device side.

12. The power system interconnection system according to claim 10, wherein the interconnection control device supplies surplus power from the charge and discharge station and the inverter device to the AC-DC power conversion device, if power that the charge and discharge station and the inverter device are able to supply is above a capacity of the first load, in a case where the electric power system is in an emergency situation.

13. The power system interconnection system according to claim 10, wherein
the interconnection control device supplies, if power that the charge and discharge station and the inverter device are able to supply is below a capacity of the first load, the first load with power from both of the charge and discharge station as well as the inverter device and the AC-DC power conversion device in a case where the electric power system is in an emergency situation.

14. The power system interconnection system according to claim 10, further comprising an interconnection board including a transformer with three windings having a first winding connected to a commercial power supply side of the power system and an inverter device side, a second winding connected to an AC-DC power conversion device side, and a third winding connected to a charge and discharge station side.

15. The power system interconnection system according to claim 14, wherein the interconnection control device supplies surplus power from the inverter device to the charge and discharge station or the AC-DC power conversion device, if power that the inverter device is able to supply is above a capacity of the first load, in a case where the electric power system is in an emergency situation.

16. The power system interconnection system according to claim 14, wherein the interconnection control device, if power that the inverter device is able to supply is below a capacity of the first load, supplies the first load with power from the inverter device and the charge and discharge station, or supplies the first load with power from the inverter device, the charge and discharge station and the AC-DC power conversion device in a case where the electric power system is in an emergency situation.

17. The power system interconnection system according to claim 10, wherein the interconnection control device, if power-receiving point power measured at a predetermined site is equal to or more than a threshold, supplies the first load and the second load with power from the charge and discharge station and the inverter device, or supplies the first load and the second load with power from the AC-DC power conversion device in a state where the electric power system is in a normal situation and where an energy management mode is set.

18. The power system interconnection system according to claim 10, wherein the interconnection control device makes an uninterruptible switching from power supplied from at least one of the charge and discharge station as well as the inverter device and the AC-DC power conversion device to the first load to power supplied from the commercial power supply in a case where the electric power system is restored.

* * * * *

UNITED STATES PATENT AND TRADEMARK OFFICE
CERTIFICATE OF CORRECTION

PATENT NO. : 11,332,030 B2
APPLICATION NO. : 17/056156
DATED : May 17, 2022
INVENTOR(S) : Ryuhei Nishio et al.

It is certified that error appears in the above-identified patent and that said Letters Patent is hereby corrected as shown below:

In the Specification

Please replace "MEV" with -- PHEV -- (Column 5, Line 44).

Please replace "hoard 20 and the interconnection hoard 30" with -- board 20 and the interconnection board 30 -- (Column 7, Line 20).

Please replace "hoard 10" with -- board 10 -- (Column 11, Line 31).

Please replace "hoard 20" with -- board 20 -- (Column 15, Line 3).

Please replace "hoard 30" with -- board 30 -- (Column 15, Line 65).

Please replace "operable" with -- openable -- (Column 16, Line 1).

Please replace "remote IQ" with -- remote IO -- (Column 18, Line 8).

Please replace "RPR/TPR" with -- RPR/UPR -- (Column 18, Line 58).

Please replace "thus not m the parking space" with -- thus not in the parking space -- (Column 21, Line 54).

Please replace "VCP 32" with -- VCB 32 -- (Column 22, Line 4).

Please replace "the auto autonomous" with -- the autonomous -- (Column 22, Line 12).

Please replace "power conversion hoard" with -- power conversion board -- (Column 29, Line 23).

Please replace "power conversion hoard" with -- power conversion board -- (Column 29, Line 26).

Signed and Sealed this
Twenty-third Day of August, 2022

Katherine Kelly Vidal
*Director of the United States Patent and Trademark Office*

Please replace "power conversion hoard" with -- power conversion board -- (Column 39, Line 54).

In the Claims

Please delete "each of the first load and the second load is not a storage battery, a charge and discharge station for an electric powered automobile, or an inverter device for a solar cell," in Claim 9 (Column 41, Lines 64-67).